(12) United States Patent
Takeda et al.

(10) Patent No.: US 11,382,112 B2
(45) Date of Patent: Jul. 5, 2022

(54) SUBSCRIBER PRIORITIZATION FOR DEVICES WITH DUAL SUBSCRIPTIONS

(71) Applicant: QUALCOMM Incorporated, San Diego, CA (US)

(72) Inventors: Kazuki Takeda, Tokyo (JP); Marco Papaleo, Bologna (IT); Masakazu Shirota, Yokohama (JP)

(73) Assignee: QUALCOMM Incorporated, San Diego, CA (US)

( * ) Notice: Subject to any disclaimer, the term of this patent is extended or adjusted under 35 U.S.C. 154(b) by 152 days.

(21) Appl. No.: 16/983,789

(22) Filed: Aug. 3, 2020

(65) Prior Publication Data

US 2022/0039110 A1    Feb. 3, 2022

(51) Int. Cl.
| H04J 3/00 | (2006.01) |
| H04W 72/12 | (2009.01) |
| H04L 5/14 | (2006.01) |
| H04W 72/10 | (2009.01) |
| H04W 88/06 | (2009.01) |

(52) U.S. Cl.
CPC ........... *H04W 72/1247* (2013.01); *H04L 5/14* (2013.01); *H04W 72/10* (2013.01); *H04W 88/06* (2013.01)

(58) Field of Classification Search
None
See application file for complete search history.

(56) References Cited

U.S. PATENT DOCUMENTS

| 2012/0314610 A1* | 12/2012 | Hou | H04W 4/60 370/252 |
| 2013/0203461 A1* | 8/2013 | Li | H04W 8/183 455/552.1 |
| 2016/0020819 A1* | 1/2016 | Anand | H04W 16/14 455/77 |
| 2016/0338077 A1 | 11/2016 | Chin et al. | |
| 2018/0359760 A1* | 12/2018 | Su | H04W 72/082 |
| 2019/0215694 A1* | 7/2019 | Rubin | H04L 63/1458 |

FOREIGN PATENT DOCUMENTS

CN    108242991 A    7/2018

OTHER PUBLICATIONS

International Search Report and Written Opinion—PCT/US2021/042201—ISA/EPO—dated Nov. 17, 2021.

* cited by examiner

*Primary Examiner* — Gerald A Smarth
(74) *Attorney, Agent, or Firm* — Holland & Hart LLP

(57) ABSTRACT

Methods, systems, and devices for wireless communications are described that provide for a wireless device with dual subscriptions to prioritize a subscriber. A user equipment (UE) may configure a first channel for a first subscription and a second channel for a second subscription. The UE may determine one or more slots for the first subscription for communicating in a first direction and for the second subscription for communicating in a second direction, where the first and second directions are different. The UE may prioritize communications of the first subscription according to the determined slots. The prioritizing may be based on the direction, whether the communications are scheduled or configured, or whether the slot includes a monitoring occasion. The UE may communicate in the first direction according to the first subscription.

30 Claims, 21 Drawing Sheets

SUBSCRIBER PRIORITIZATION FOR DEVICES WITH DUAL SUBSCRIPTIONS

FIELD OF TECHNOLOGY

The following relates to wireless communications, including subscriber prioritization for devices with dual subscriptions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

Some wireless communications systems may support communications between a user equipment (UE) and multiple networks and in some cases, multiple channels. Communicating in different directions at the same time, however, may be associated with increased interference and reduced communications performance. The described techniques relate to improved methods, systems, devices, and apparatuses that support subscriber prioritization for devices with dual subscriptions. Generally, the described techniques enable a wireless device (e.g., a UE) to prioritize a first subscriber over a second subscriber when communications in one or more slots are in different directions. The prioritization may be based on whether communications for one subscriber are associated with a configuration (e.g., a time-division duplex configuration) or are dynamically scheduled, among other aspects or conditions. In some cases, the prioritization may be performed based on a transmission type scheduled or whether the slot is configured for monitoring.

A method of wireless communications at a UE is described. The method may include configuring a first channel of the UE for a first subscription and a second channel of the UE for a second subscription, determining one or more slots for the first subscription for communicating in a first direction and for the second subscription for communicating in a second direction, the first direction including one of an uplink direction or a downlink direction and the second direction including the other of the uplink direction or downlink direction different than the first direction, prioritizing communications of the first subscription in the one or more slots over communications of the second subscription based on the determining, and communicating in the first direction using the first channel in the one or more slots according to the first subscription based on the prioritizing.

An apparatus for wireless communications at a UE is described. The apparatus may include a processor, memory coupled with the processor, and instructions stored in the memory. The instructions may be executable by the processor to cause the apparatus to configure a first channel of the UE for a first subscription and a second channel of the UE for a second subscription, determine one or more slots for the first subscription for communicating in a first direction and for the second subscription for communicating in a second direction, the first direction including one of an uplink direction or a downlink direction and the second direction including the other of the uplink direction or downlink direction different than the first direction, prioritize communications of the first subscription in the one or more slots over communications of the second subscription based on the determining, and communicate in the first direction using the first channel in the one or more slots according to the first subscription based on the prioritizing.

Another apparatus for wireless communications at a UE is described. The apparatus may include means for configuring a first channel of the UE for a first subscription and a second channel of the UE for a second subscription, determining one or more slots for the first subscription for communicating in a first direction and for the second subscription for communicating in a second direction, the first direction including one of an uplink direction or a downlink direction and the second direction including the other of the uplink direction or downlink direction different than the first direction, prioritizing communications of the first subscription in the one or more slots over communications of the second subscription based on the determining, and communicating in the first direction using the first channel in the one or more slots according to the first subscription based on the prioritizing.

A non-transitory computer-readable medium storing code for wireless communications at a UE is described. The code may include instructions executable by a processor to configure a first channel of the UE for a first subscription and a second channel of the UE for a second subscription, determine one or more slots for the first subscription for communicating in a first direction and for the second subscription for communicating in a second direction, the first direction including one of an uplink direction or a downlink direction and the second direction including the other of the uplink direction or downlink direction different than the first direction, prioritize communications of the first subscription in the one or more slots over communications of the second subscription based on the determining, and communicate in the first direction using the first channel in the one or more slots according to the first subscription based on the prioritizing.

Some examples of the method, apparatuses, and non-transitory computer-readable medium described herein may further include operations, features, means, or instructions for receiving a time division duplex uplink-downlink configuration for the first subscription for a set of slots including the one or more slots, where determining the one or more slots may be based on the time division duplex uplink-downlink configuration.

Some examples of the method, apparatuses, and non-transitory computer-readable medium described herein may further include operations, features, means, or instructions for receiving a second time division duplex uplink-downlink configuration for the second subscription for a second set of slots including the one or more slots, and determining a difference between the first direction and the second direction for the one or more slots based in part on the time division duplex uplink-downlink configuration and the second time division duplex uplink-downlink configuration, where the prioritizing may be based on the difference.

Some examples of the method, apparatuses, and non-transitory computer-readable medium described herein may further include operations, features, means, or instructions for receiving scheduling information indicating a transmission for the second subscription in the second direction via at least one slot of the one or more slots, and determining a difference between the first direction and the second direction for the at least one slot based in part on the time division duplex uplink-downlink configuration and the transmission for the second subscription in the second direction, where the prioritizing may be based on the difference.

Some examples of the method, apparatuses, and non-transitory computer-readable medium described herein may further include operations, features, means, or instructions for receiving a time division duplex uplink-downlink configuration for the second subscription for a set of slots including the one or more slots, where determining the one or more slots may be based on the time division duplex uplink-downlink configuration.

Some examples of the method, apparatuses, and non-transitory computer-readable medium described herein may further include operations, features, means, or instructions for receiving scheduling information indicating a transmission for the first subscription in the first direction via at least one slot of the one or more slots, and determining a difference between the first direction and the second direction for the at least one slot based in part on the time division duplex uplink-downlink configuration and the transmission for the first subscription in the first direction, where the prioritizing may be based on the difference.

Some examples of the method, apparatuses, and non-transitory computer-readable medium described herein may further include operations, features, means, or instructions for determining a monitoring occasion for the second subscription in the one or more slots that at least partially overlaps in time with an uplink transmission for the first subscription in the one or more slots, and prioritizing communications of the first subscription based on the uplink transmission for the first subscription and the monitoring occasion for the second subscription.

In some examples of the method, apparatuses, and non-transitory computer-readable medium described herein, the uplink transmission for the first subscription may be a semi-statically configured uplink transmission including one of a random access channel, an uplink control channel, an uplink shared channel, or a reference signal.

Some examples of the method, apparatuses, and non-transitory computer-readable medium described herein may further include operations, features, means, or instructions for determining an uplink transmission for the second subscription in the one or more slots that at least partially overlaps in time with a monitoring occasion for the first subscription in the one or more slots, and prioritizing communications of the first subscription based on the monitoring occasion for the first subscription and the uplink transmission for the second subscription.

In some examples of the method, apparatuses, and non-transitory computer-readable medium described herein, the uplink transmission for the second subscription may be a semi-statically configured uplink transmission including one of a random access channel, an uplink control channel, an uplink shared channel, or a reference signal.

Some examples of the method, apparatuses, and non-transitory computer-readable medium described herein may further include operations, features, means, or instructions for determining a downlink transmission for the second subscription in the one or more slots that at least partially overlaps in time with an uplink transmission for the first subscription in the one or more slots, and prioritizing communications of the first subscription based on the uplink transmission for the first subscription and the downlink transmission for the second subscription.

Some examples of the method, apparatuses, and non-transitory computer-readable medium described herein may further include operations, features, means, or instructions for determining an uplink transmission for the second subscription in the one or more slots that at least partially overlaps in time with a downlink transmission for the first subscription in the one or more slots, and prioritizing communications of the first subscription based on the downlink transmission for the first subscription and the uplink transmission for the second subscription.

Some examples of the method, apparatuses, and non-transitory computer-readable medium described herein may further include operations, features, means, or instructions for transmitting, to a base station, a capability message indicating that the UE supports communications of the first subscription and communications of the second subscription.

Some examples of the method, apparatuses, and non-transitory computer-readable medium described herein may further include operations, features, means, or instructions for transmitting, to a base station supporting communications of the second subscription, a message indicating that communications of the first subscription in the one or more slots may be prioritized over communications of the second subscription.

In some examples of the method, apparatuses, and non-transitory computer-readable medium described herein, prioritizing may include operations, features, means, or instructions for prioritizing communications of the first subscription in the one or more slots over communications of the second subscription based on the first subscription corresponding to a primary subscription of the UE and the second subscription corresponding to a second subscription of the UE.

Some examples of the method, apparatuses, and non-transitory computer-readable medium described herein may further include operations, features, means, or instructions for receiving a prioritization configuration from a base station indicating that the first subscription may be of higher priority than the second subscription, where the prioritizing may be based on the prioritization configuration.

Some examples of the method, apparatuses, and non-transitory computer-readable medium described herein may further include operations, features, means, or instructions for refraining from communicating in the second direction using the second channel in one or more slots according to the second subscription based on the prioritizing.

In some examples of the method, apparatuses, and non-transitory computer-readable medium described herein, the communicating further may include operations, features, means, or instructions for communicating in the first direction in a half-duplex mode.

A method of wireless communications at a base station is described. The method may include configuring a first channel of a UE for communications of a first subscription of the UE, receiving, from the UE, a message indicating that communications of a second subscription of the UE in one or more slots are prioritized over communications of the first subscription, and transmitting, to the UE, scheduling information for the first channel based on the message, the scheduling information indicating communications of the first subscription of the UE in at least one slot non-overlapping with the one or more slots.

An apparatus for wireless communications at a base station is described. The apparatus may include a processor, memory coupled with the processor, and instructions stored in the memory. The instructions may be executable by the processor to cause the apparatus to configure a first channel of a UE for communications of a first subscription of the UE, receive, from the UE, a message indicating that communications of a second subscription of the UE in one or more slots are prioritized over communications of the first subscription, and transmit, to the UE, scheduling information for the first channel based on the message, the scheduling information indicating communications of the first subscription of the UE in at least one slot non-overlapping with the one or more slots.

Another apparatus for wireless communications at a base station is described. The apparatus may include means for configuring a first channel of a UE for communications of a first subscription of the UE, receiving, from the UE, a message indicating that communications of a second subscription of the UE in one or more slots are prioritized over communications of the first subscription, and transmitting, to the UE, scheduling information for the first channel based on the message, the scheduling information indicating communications of the first subscription of the UE in at least one slot non-overlapping with the one or more slots.

A non-transitory computer-readable medium storing code for wireless communications at a base station is described. The code may include instructions executable by a processor to configure a first channel of a UE for communications of a first subscription of the UE, receive, from the UE, a message indicating that communications of a second subscription of the UE in one or more slots are prioritized over communications of the first subscription, and transmit, to the UE, scheduling information for the first channel based on the message, the scheduling information indicating communications of the first subscription of the UE in at least one slot non-overlapping with the one or more slots.

Some examples of the method, apparatuses, and non-transitory computer-readable medium described herein may further include operations, features, means, or instructions for transmitting a prioritization configuration to the UE indicating that the second subscription may be of higher priority than the first subscription.

Some examples of the method, apparatuses, and non-transitory computer-readable medium described herein may further include operations, features, means, or instructions for receiving, from the UE, a capability message indicating that the UE supports communications of the first subscription and communications of the second subscription.

Some examples of the method, apparatuses, and non-transitory computer-readable medium described herein may further include operations, features, means, or instructions for transmitting a time division duplex uplink-downlink configuration for the first subscription for a set of slots including the one or more slots based on the message, where the time division duplex uplink-downlink configuration modifies a communication direction of the first subscription in the one or more slots.

DETAILED DESCRIPTION

Figure 1:
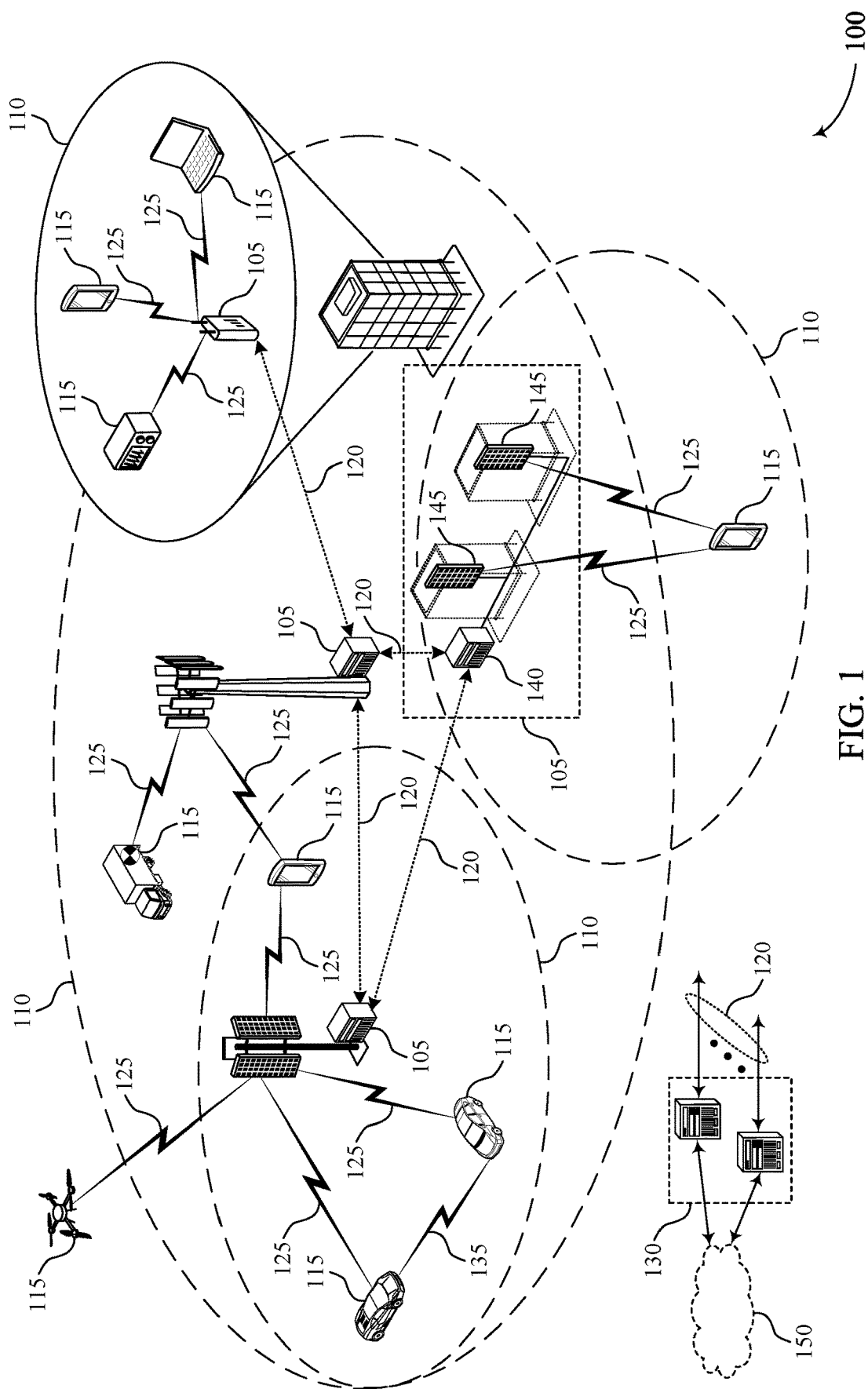
FIG. 1 illustrates an example of a wireless communications system that supports subscriber prioritization for devices with dual subscriptions in accordance with aspects of the present disclosure.

In some wireless communications systems, a UE may communicate with more than one network operator on multiple channels. For example, a UE may support two subscriber identity modules (SIMs). The UE may communicate with a first network over a first channel using a first SIM and with a second network over a second channel using a second SIM. Both networks may share a same frequency deployment. In some cases, the UE may monitor paging from the first network while communicating with the second network (e.g., in a dual-SIM dual standby (DSDS) configuration), while in other cases, the UE may communicate with both networks at the same time (e.g., in a dual-SIM dual active (DSDA) configuration). In any case, however, conflict may arise if communications in different directions occur in overlapping time slots. For example, the UE may experience interference between the two channels. Additionally, the UE may be unable to transmit uplink and receive downlink simultaneously, which may lead to increased latency and reduced transmission capacity.

As described herein, a UE configured with dual subscriptions may prioritize one subscriber over the other in instances of conflicting time slots. The prioritization may be semi-static or dynamic. As an example, for a set of slots, the UE may be configured (e.g., semi-statically or via a time division duplex (TDD) configuration) with uplink transmissions for the first subscription and with monitoring occasions for the second subscription. The UE may determine to prioritize the first subscription based on the configured transmissions and may refrain from monitoring paging on the second subscription for the set of slots. Similarly, the UE may be scheduled to transmit an uplink transmission for the first subscription and receive a downlink transmission for the second subscription in the same slot (or set of slots). The UE may prioritize the uplink transmissions for the first subscription and may refrain from receiving the downlink transmission for the second subscription.

In some cases, the UE may report dual subscription information to a base station (e.g., of the first or second subscription). For example, the UE may transmit capability information indicating that the UE supports dual subscription communications. The UE may also transmit a message indicating which subscriber is prioritized, or which slots or sets of slots have conflicting communications directions. In some examples, the base station may adjust scheduling or a communications configuration for the UE according to the subscription information received from the UE.

Aspects of the disclosure are initially described in the context of wireless communications systems. Aspects of the disclosure are then illustrated by slot configurations and a process flow. Aspects of the disclosure are further illustrated by and described with reference to apparatus diagrams, system diagrams, and flowcharts that relate to subscriber prioritization for devices with dual subscriptions.

FIG. 1 illustrates an example of a wireless communications system 100 that supports subscriber prioritization for devices with dual subscriptions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In the wireless communications system 100, a UE 115 may be configured with multiple channels for multiple subscriptions, each subscription enabling the UE 115 to communicate with a base station 105. In some examples, the UE 115 may be configured or scheduled with communications from each subscription in overlapping time slots, and the communications may, in some time slots, be in different directions. In such examples, the UE 115 may determine to prioritize communications of one subscription over communications of another subscription in the conflicting time slots. For example, in a set of slots, the UE 115 may prioritize uplink transmissions for a first subscription over downlink transmissions of a second subscription, or vice versa. The UE 115 may thus communicate using the corresponding channel according to the prioritized subscription.

Figure 2:
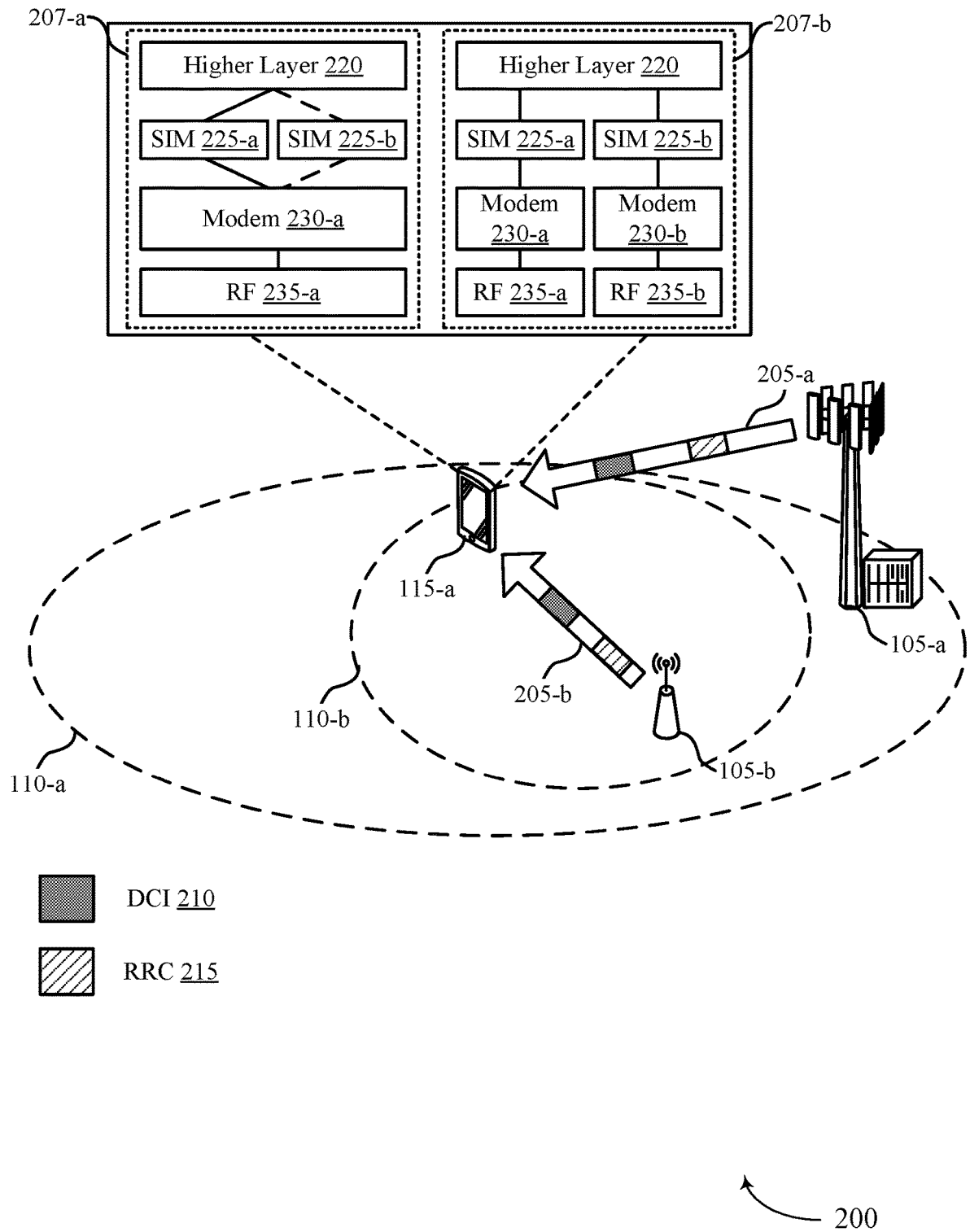
FIG. 2 illustrates an example of a wireless communications system that supports subscriber prioritization for devices with dual subscriptions in accordance with aspects of the present disclosure.

FIG. 2 illustrates an example of a wireless communications system 200 that supports subscriber prioritization for devices with dual subscriptions in accordance with aspects of the present disclosure. In some examples, wireless communications system 200 may implement aspects of wireless communications system 100. In the example of FIG. 2, wireless communications system 200 may include a UE 115-a, a first base station 105-a, and a second base station 105-b. The UE 115-a and base stations 105 may be an example of one or more UEs 115 and base stations 105, respectively, as described herein with reference to FIG. 1. The first base station 105-a may be associated with a coverage area 110-a. Additionally, the second base station 105-b may be associated with a coverage area 110-b. Both the first base station 105-a and the second base station 105-b may communicate with the UE 115-a over channels 205-a and 205-b, respectively.

The UE 115-a may be a dual SIM UE configured to operate according to two subscriptions, and each subscription may correspond to a network. For example, the first base station 105-a may support communications for a first network (e.g., a public 5G network) and may be associated with a first subscription of the UE 115-a, and the second base station 105-b may support communications for a second network (e.g., a local 5G network) and may be associated with a second subscription of the UE 115-a. Both networks may share a same frequency bandwidth and may utilize time division duplex (TDD) operations (e.g., half duplex operations). The UE 115-a may thus communicate with the base station 105-a according to the first subscription, and with the base station 105-b according to the second subscription.

The base stations 105 may configure the UE 115-a for communications according to the respective subscriptions over the respective channels 205. For example, the base station 105-a may configure the UE 115-a with the channel 205-a for communications of the first subscription, and the base station 105-b may configure the UE 115-a with the channel 205-b for communications of the second subscription. Each base station 105 may configure or schedule communications in a set of slots for the corresponding subscription. That is, the base station 105-a may transmit an RRC message 215 that includes a TDD configuration for the first subscription. The TDD configuration may include a TDD pattern indicating resource assignments for a set of slots (e.g., as described with reference to FIGS. 3 and 4). The UE 115-a may then communicate with the base station 105-a according to the TDD configuration in each slot. Similarly, the base station 105-b may transmit a DCI message 210 that includes scheduling information for each slot in the set of slots, and the UE 115-a may communicate with each base station 105 according to the scheduling information in each slot.

In some cases, one or more slots may include communications in different directions for the two subscriptions. For example, a slot (or a set of slots) may be for communicating in an uplink direction (e.g., transmitting a semi-static uplink transmission, transmitting a scheduled uplink transmission, etc.) for the first subscription and for communicating in a downlink direction (e.g., a monitoring occasion, receiving a downlink transmission, etc.) for the second subscription. However, the UE 115-a may be limited in its capability of communicating in different directions or with different subscribers in the same slot. For example, the UE 115-a may communicate in a half-duplex mode (e.g., may be capable of communicating in only one direction at a time). Additionally or alternatively, the UE 115-a may be constrained by a hardware configuration 207, and may not be capable of communicating with both subscribers at the same time. In cases where the UE 115-a is capable of communicating in different directions or with both subscribers at the same time, communications in different directions may still increase interference between the channels, and the UE 115-a may suffer reduced performance.

As an example of a hardware constraint, the UE 115-a may be a DSDS device. That is, the UE 115-a may include a hardware configuration 207-a that enables the UE 115-a to perform DSDS operations. In this case, the hardware configuration 207-a may include a higher layer 220, two SIMs 225, a modem 230-a, and an RF chain 235-a. Hardware configuration 207-a may support DSDS operations such that the UE 115-a may communicate with a first subscriber using SIM 225-a and with a second subscriber using SIM 225-b. Because hardware configuration 207-a may include a single modem 230-a and a single RF chain 235-a, the UE 115-a may not be capable of actively communicating with both subscribers simultaneously; instead, the UE 115-a may monitor paging from the first subscriber while communicating with the second subscriber (or vice versa). The UE 115-a may also monitor paging from both subscribers simultaneously.

Alternatively, the UE 115-a may be a DSDA device. The UE 115-a may include a hardware configuration 207-b that includes a higher layer 220, two SIMs 225, two modems 230, and two RF chains 235. The UE 115-a may thus be capable of communicating with the first subscriber using SIM 225-a, modem 230-a, and RF chain 235-a, while simultaneously communicating with the second subscriber using SIM 225-b, modem 230-b, and RF chain 235-b. The UE 115-a may also monitor paging from the first subscriber while communicating with the second subscriber (or vice versa), or may monitor paging from both subscribers simultaneously.

To enable the UE 115-a to communicate effectively with both subscribers in cases where a slot or set of slots includes communications in different directions, the UE 115-a may prioritize communications of one subscription over communications of the other subscription. As an example, the base station 105-a may transmit a TDD configuration in RRC message 215 that configures the UE 115-a for communications of the first subscription in a first direction for a set of slots. The base station 105-b may transmit scheduling information in a DCI message 210 for communications of the second subscription in a second direction for the same set of slots. The UE 115-*a* may choose to prioritize the first subscription over the second subscription according to the TDD configuration. Alternatively, the UE 115-*a* may choose to prioritize the second subscription over the first subscription based on the scheduling information.

Figure 3:
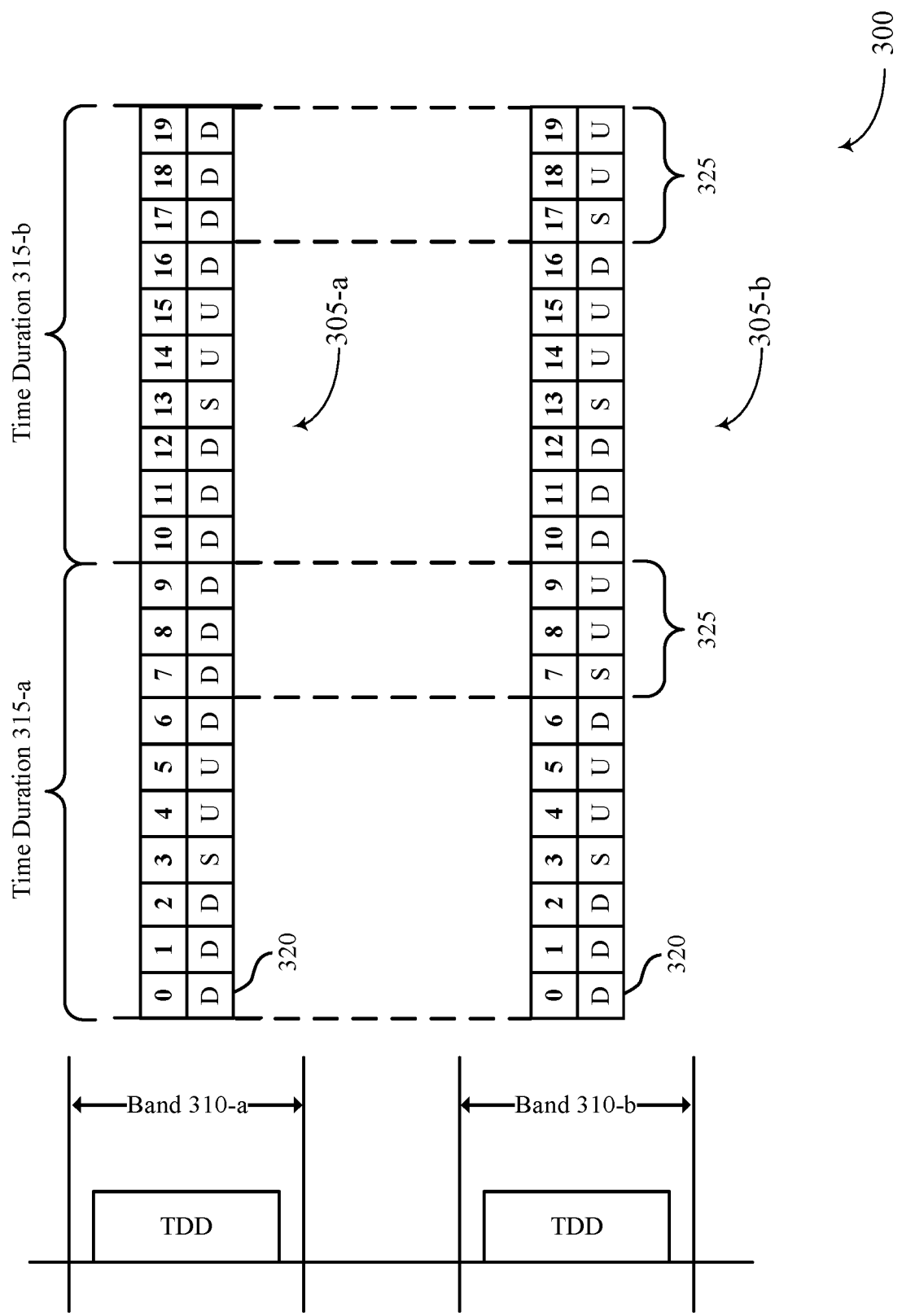
FIGS. 3 and 4 illustrate examples of slot configurations that support subscriber prioritization for devices with dual subscriptions in accordance with aspects of the present disclosure.

In some examples, the UE 115-*a* may inform one or both of the base stations 105 of the prioritization. For example, if the UE 115-*a* determines to prioritize the first subscription (e.g., associated with the base station 105-*a*), the UE 115-*a* may transmit a message to base station 105-*a*, base station 105-*b*, or both, indicating that the first subscription is the prioritized subscription. The message may also include an indication of the slot(s) in which the communications are prioritized. Additionally or alternatively, the message may indicate that the second subscription is a de-prioritized subscription and in some cases, may also indicate the slot(s) in which the communications are de-prioritized. Accordingly, the base station 105 associated with the non-prioritized subscription (e.g., base station 105-*b*) may transmit an adjusted TDD configuration to modify the communication direction in the slot(s). In some cases, the base station 105-*b* may transmit scheduling information to the UE 115-*a* that FIG. 3 illustrates an example of slot configurations 300 that support subscriber prioritization for devices with dual subscriptions in accordance with aspects of the present disclosure. In some examples, slot configurations 300 may implement aspects of wireless communications systems 100 and 200.

Slot configurations 300 include a slot configuration 305-*a* and a slot configuration 305-*b*. The slot configuration 305-*a* may be configured by a first base station (e.g., a base station 105-*a* as described with reference to FIG. 2) for use by a UE (e.g., a UE 115) for communications of a first subscription on a frequency band 310-*a*. Similarly, the slot configuration 305-*b* may be configured by a second base station (e.g., a base station 105-*b* as described with reference to FIG. 2) for use by the UE (e.g., a UE 115-*a*) for communications of a second subscription on a frequency band 310-*b*. Each slot configuration 305 may include a set of slots 320 over a time duration 315 (e.g., 5 ms). The slot configurations 305 may be aligned in time.

Each slot 320 may carry uplink (UL) ("U") or downlink (DL) ("D") traffic, and special slots ("S") 320 may be used to switch from DL to UL transmission. Special slots 320 may carry some DL and/or UL traffic and may include a Guard Period (GP) between DL and UL traffic. Switching from UL to DL traffic may be achieved by setting timing advance at the UE without the use of Special subframes or a guard period between UL and DL subframes. In this example, slot configuration 305-*a* includes slots 0-2 and 6-10 that carry DL traffic in time duration 315-*a*, and slots 10-12 and 16-19 that carry DL traffic in time duration 315-*b*. Slot configuration 305-*a* also includes special slot 3 and UL slots 4-5 in time duration 315-*a*, and special slot 13 and UL slots 14-15 in time duration 315-*b*. Slot configuration 305-*b* includes slots 0-2 and 6 that carry DL traffic in time duration 315-*a*, and slots 10-12 and 16 that carry DL traffic in time duration 315-*b*. Slot configuration 305-*b* also includes special slots 3 and 7 and UL slots 4-5 and 8-9 in time duration 315-*a*, and special slots 13 and 17 and UL slots 14-15 and 18-19 in time duration 315-*b*. Allocation of UL and DL slots 320 in each slot configuration 305 may be configured or reconfigured semi-statically (e.g., RRC messages via backhaul, etc.) or dynamically (e.g., via scheduling information). It is to be understood that the example of FIG. 3 is for illustration and discussion purposes only, and that other configurations may be configured in accordance with the techniques discussed herein.

In this example, slot configuration 305-*a* and slot configuration 305-*b* may include some synchronous slots 320 (e.g., slots 320 with traffic of the same direction for each subscription) and some asynchronous slots 320 (e.g., slots 320 with traffic of different directions for each subscription). As illustrated, slots 0-6 and slots 10-16 are synchronized between slot configuration 305-*a* and slot configuration 305-*b*. Slots 7-9 and 17-19, noted by subsets 325, are asynchronous across slot configurations 305.

A UE configured with slot configuration 305-*a* for communications of a first subscription and slot configuration 305-*b* for communications of a second subscription may prioritize one subscription over the other, for instance, in cases where the communications for each subscription are in opposite directions (e.g., in slot subset 325). As an example, in slot 8, the UE is configured with a downlink transmission for the first subscription and an uplink transmission for the second subscription. The downlink transmission in slot 8 may be configured via a TDD configuration or scheduled. In some cases, the downlink traffic in slot 8 may be a configured monitoring occasion. Similarly, the uplink transmission in slot 8 may be a scheduled uplink transmission or configured via a TDD configuration. In some examples, the UE may prioritize the downlink transmission belonging to the first subscriber in slot 8 over the uplink transmission belonging to the second subscriber.

Figure 4:
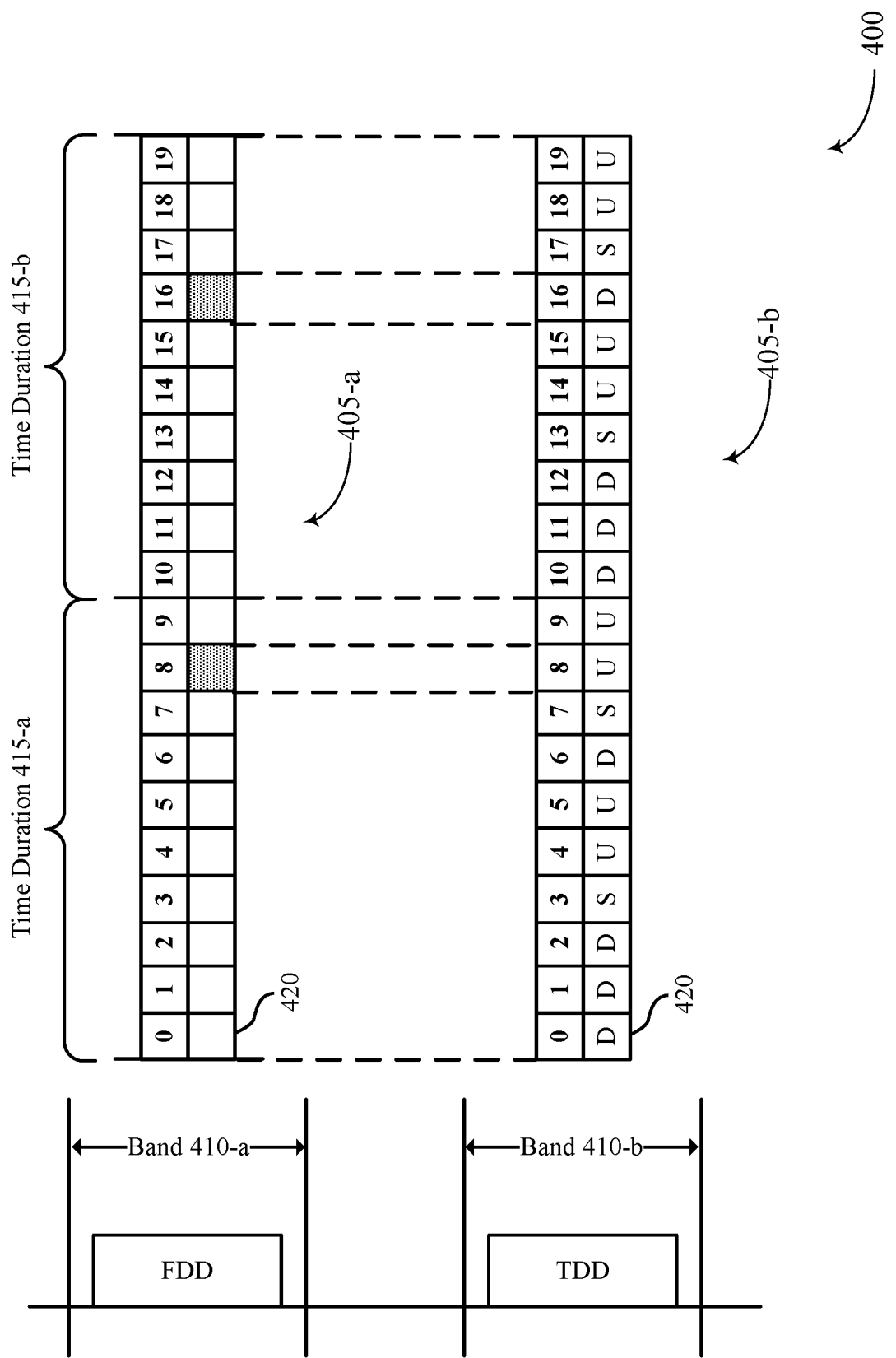

FIG. 4 illustrates an example of slot configurations 400 that support subscriber prioritization for devices with dual subscriptions in accordance with aspects of the present disclosure. In some examples, slot configurations 400 may implement aspects of wireless communications system 100 and 200.

Slot configurations 400 include a slot configuration 405-*a* and a slot configuration 405-*b*. The slot configuration 405-*a* may be configured by a first base station (e.g., a base station 105-*a* as described with reference to FIG. 2) for use by a UE (e.g., a UE 115) for communications of a first subscription on a frequency band 410-*a*. Similarly, the slot configuration 405-*b* may be configured by a second base station (e.g., a base station 105-*b* as described with reference to FIG. 2) for use by the UE (e.g., a UE 115-*a*) for communications of a second subscription on a frequency band 310-*b*. Each slot configuration 405 may include a set of slots 420 over a time duration 415 (e.g., 5 ms). The slot configurations 405 may be aligned in time.

Each slot 420 may carry UL ("U") or DL ("D") traffic, and special slots ("S") 420 may be used to switch from DL to UL transmission. Special slots 420 may carry some DL and/or UL traffic and may include a Guard Period (GP) between DL and UL traffic. Switching from UL to DL traffic may be achieved by setting timing advance at the UE without the use of Special subframes or a guard period between UL and DL subframes. In this example, slot configuration 4305-*a* is configured for a frequency division duplex configuration such that slots 420 may be scheduled for uplink or downlink traffic. Slot configuration 405-*b* is configured with a time division duplex configuration and includes slots 0-2 and 6 that carry DL traffic in time duration 415-*a*, and slots 10-12 and 16 that carry DL traffic in time duration 415-*b*. Slot configuration 405-*b* also includes special slots 3 and 7 and UL slots 4-5 and 8-9 in time duration 415-*a*, and special slots 13 and 17 and UL slots 14-15 and 18-19 in time duration 415-*b*. Allocation of UL and DL slots 420 in each slot configuration 405 may be configured or reconfigured semi-statically (e.g., RRC messages via backhaul, etc.) or dynamically (e.g., via scheduling information). It is to be understood that the example of FIG. 4 is for illustration and discussion purposes only, and that other configurations may be configured in accordance with the techniques discussed herein.

In this example, slot configuration 405-*a* and slot configuration 305-*b* may include some synchronous slots 420 (e.g., slots 420 with traffic of the same direction for each subscription) and some asynchronous slots 420 (e.g., slots 420 with traffic of different directions for each subscription). As illustrated, slots 0-6 and slots 10-16 are synchronized between slot configuration 305-*a* and slot configuration 305-*b*. Slots 8 and 18, however, have asynchronous communications.

A UE configured with slot configuration 405-*a* for communications of a first subscription and slot configuration 405-*b* for communications of a second subscription may prioritize one subscription over the other, for instance, in cases where the communications for each subscription are in opposite directions (e.g., in slots 8 and 18). As an example, in slot 8, the UE is configured with a downlink transmission for the first subscription and an uplink transmission for the second subscription. The downlink transmission in slot 8 may be configured via an FDD configuration or scheduled. In some cases, the downlink traffic in slot 8 may be a configured monitoring occasion. Similarly, the uplink transmission in slot 8 may be a scheduled uplink transmission or configured via a TDD configuration. In some examples, the UE may prioritize the downlink transmission belonging to the first subscriber in slot 8 over the uplink transmission belonging to the second subscriber.

Figure 5:
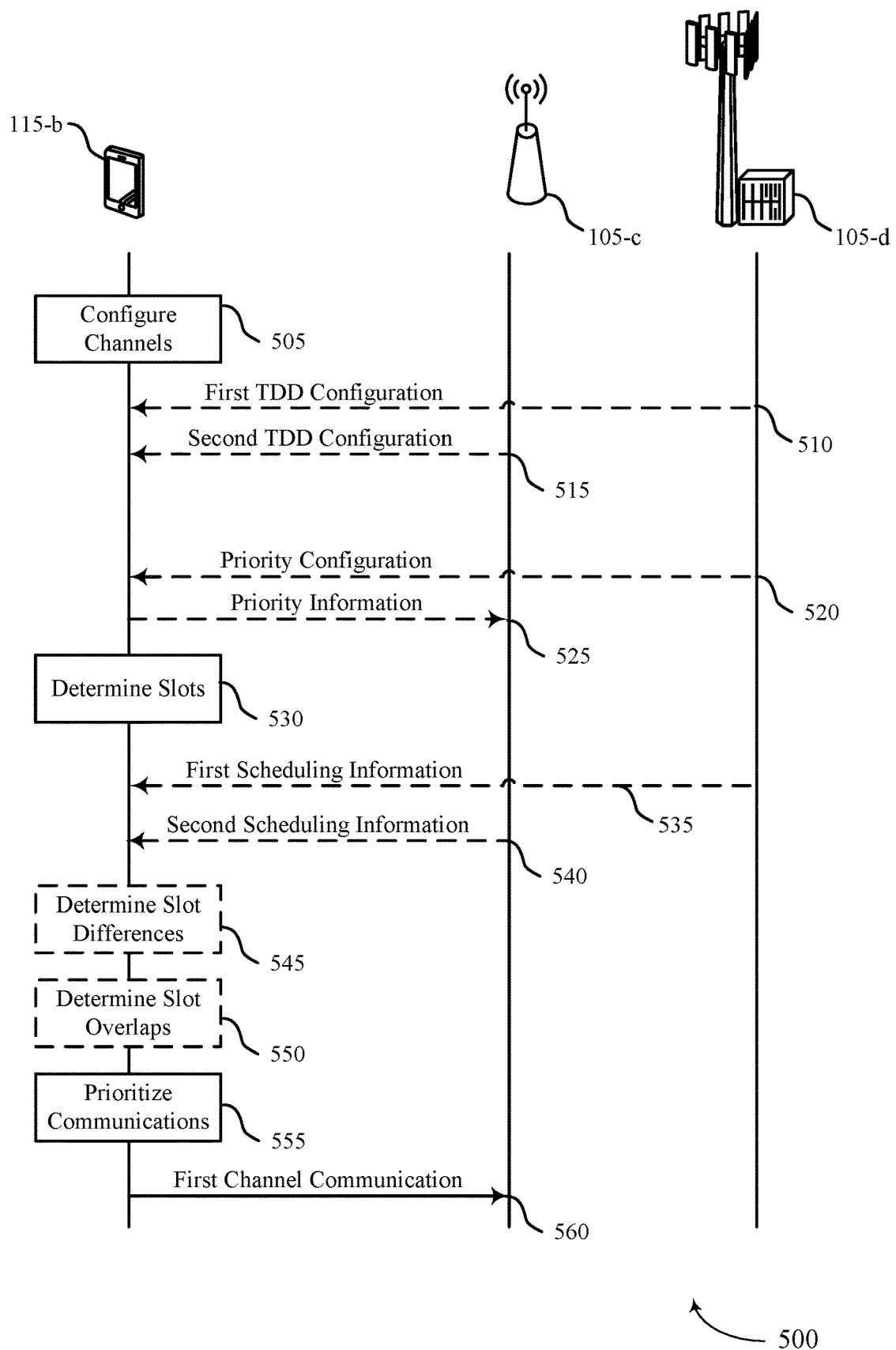
FIG. 5 illustrates an example of a process flow that supports subscriber prioritization for devices with dual subscriptions in accordance with aspects of the present disclosure.

FIG. 5 illustrates an example of a process flow 500 that supports subscriber prioritization for devices with dual subscriptions in accordance with aspects of the present disclosure. In some examples, process flow 500 may implement aspects of wireless communications systems 100 or 200. Process flow 500 may include a UE 115-*b*, a first base station 105-*c*, and a second base station 105-*d*. UE 115-*a* may be examples of one or more UEs as described herein with reference to FIGS. 1 and/or 2. Base stations 105-*c* and 105-*d* may be examples of base stations as described herein with reference to FIGS. 1 and/or 2. For example, base station 105-*d* may be associated with a first network and a first subscription and base station 105-*c* may be associated with a second network and a second subscription.

At 505, the UE 115-*b* may configure one or more channels for communications with base stations 105-*c* and 105-*d*. The UE 115-*a* may configure a first channel for a first subscription corresponding to base station 105-*d* and a second channel for a second subscription corresponding to base station 105-*c*.

At 510, base station 105-*d* may optionally transmit a first TDD configuration on the first channel for the first subscription to UE 115-*b*. The TDD configuration may include a resource allocation for each slot of a set of slots in a time period. Accordingly, each slot may carry uplink or downlink traffic (e.g., as described with reference to FIGS. 3 and 4) for the first subscription.

At 515, base station 105-*c* may optionally transmit a second TDD configuration on the second channel for the second subscription to the UE 115-*b*. The second TDD configuration may include a resource allocation for each slot of the same set of slots as the first TDD configuration (e.g., in the same time period). Each slot may carry uplink or downlink traffic (e.g., as described with reference to FIGS. 3 and 4) for the second subscription. In some cases, the TDD configurations may be synchronous for one or more slots of the set of slots (e.g., may carry traffic in the same direction), asynchronous for one or more slots of the set of slots (e.g., carry traffic in different directions), or some combination thereof.

At 520, base station 105-*d* may transmit a priority configuration to UE 115-*b*. The priority configuration may include an indication that the first subscription is of higher priority than the second subscription. Alternatively, the priority configuration may include an indication that the second subscription is of higher priority than the first subscription. Or alternatively, base station 105-*d* may not transmit a priority configuration to UE 115-*b*, in which case priority information (e.g., a priority configuration) may be transmitted by UE 115-*b* to base station 105-*d* indicating which subscription is prioritized at the UE 115-*b*.

At 525, the UE 115-*b* may transmit priority information to base station 105-*c*. In some cases, the priority information may include an indication that the first subscription is prioritized over the second subscription. In some examples, the priority information may indicate that communications of the first subscription in one or more slots are prioritized over communications of the second subscription in the one or more slots. Alternatively, the priority information may indicate that the second subscription is prioritized over the first subscription, or that communications of the second subscription are prioritized in one or more slots over communications of the second subscription in the same one or more slots.

At 530, the UE 115-*b* may determine one or more slots for communications of the first and second subscriptions. The UE 115-*b* may determine that the first subscription includes communications in a first direction and the second subscription includes communications in a second direction. The first direction may be uplink or downlink and the second direction may be uplink or downlink, but the first direction is different than the second direction.

At 535, base station 105-*d* may optionally transmit scheduling information indicating transmissions for the first subscription in the one or more slots determined by the UE 115-*b* (e.g., at 530).

At 540, base station 105-*c* may optionally transmit scheduling information indicating transmissions for the second subscription in the one or more slots determined by the UE 115-*b* (e.g., at 530).

At 545, the UE 115-*b* may determine that the communications for the first and second subscriptions in the slots determined at 530 are for communications in different directions.

At 550, the UE 115-*b* may determine that transmissions in the slots determined at 530 overlap. For example, the UE 115-*b* may determine that an uplink transmission for the first subscription overlaps in time (e.g., at least partially) with a downlink transmission for the second subscription in the slots.

At 555, the UE 115-*b* may determine to prioritize communications of the first subscription over communications of the second subscription in the one or more slots. The prioritization may be based on the determining performed at 530, 545, 550, or some combination thereof. The prioritization may also be based on the priority configuration received at 520, the scheduling information received at 535 or 540, or some combination thereof.

At 560, the UE 115-*b* may communicate with the base station corresponding to the prioritized subscription. For example, the UE 115-*b* may prioritize the second subscription (e.g., at 555) and may communicate with base station 105-c according to the second subscription. The communication may occur in the direction of the transmissions scheduled or configured for the one or more slots determined at 530. The communication may occur over the channel corresponding to the first subscription.

Figure 6:
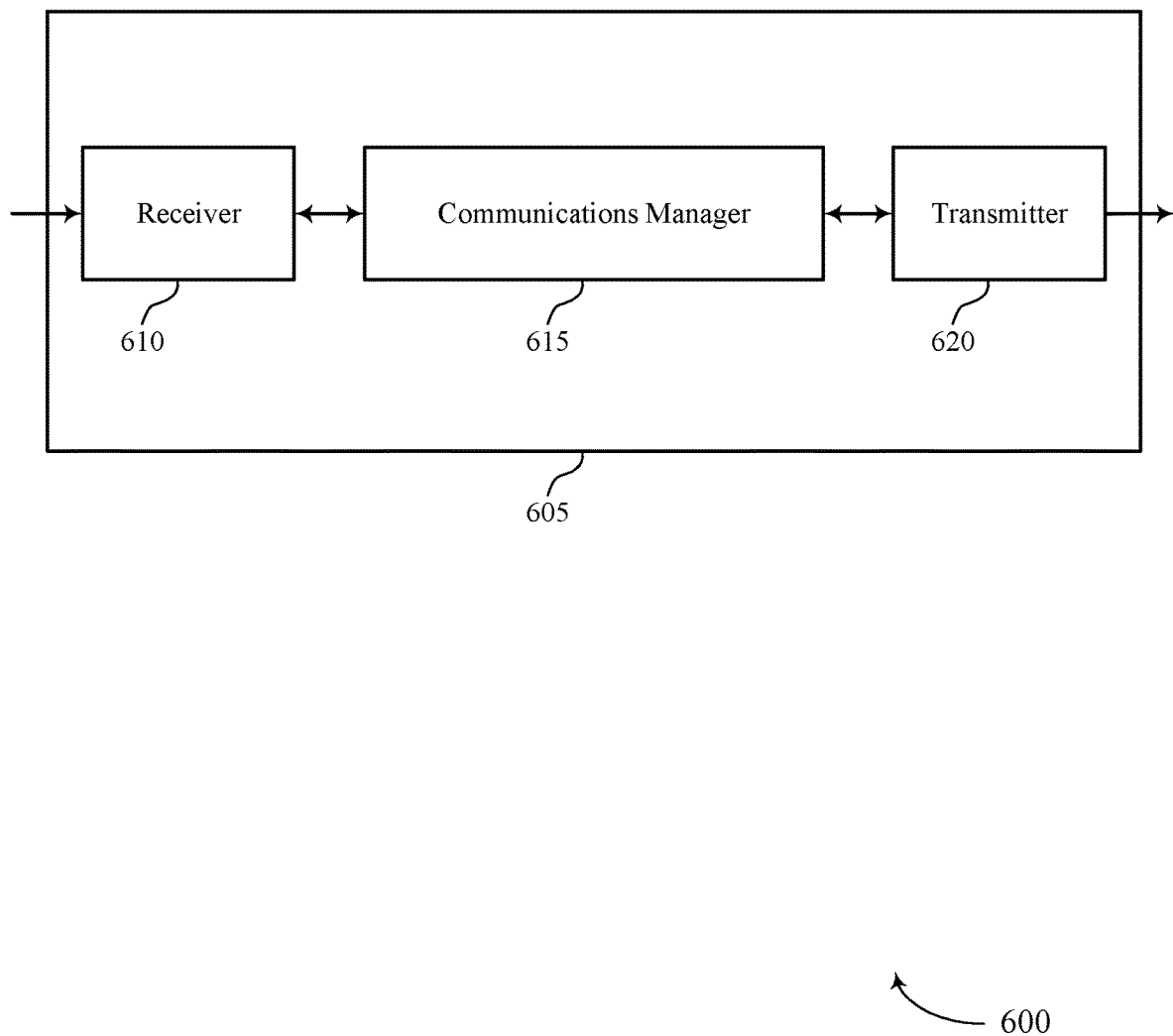
FIGS. 6 and 7 show block diagrams of devices that support subscriber prioritization for devices with dual subscriptions in accordance with aspects of the present disclosure.

FIG. 6 shows a block diagram 600 of a device 605 that supports subscriber prioritization for devices with dual subscriptions in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to subscriber prioritization for devices with dual subscriptions, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may configure a first channel of the UE for a first subscription and a second channel of the UE for a second subscription. The communications manager 615 may determine one or more slots for the first subscription for communicating in a first direction and for the second subscription for communicating in a second direction, the first direction including one of an uplink direction or a downlink direction and the second direction including the other of the uplink direction or downlink direction different than the first direction. The communications manager 615 may prioritize communications of the first subscription in the one or more slots over communications of the second subscription based on the determining. The communications manager 615 may communicate in the first direction using the first channel in the one or more slots according to the first subscription based on the prioritizing. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

In some examples, the communications manager 615 may be implemented as an integrated circuit or chipset for a mobile device modem, and the receiver 610 and transmitter 620 may be implemented as analog components (e.g., amplifiers, filters, antennas) coupled with the mobile device modem to enable wireless transmission and reception over one or more bands.

The communications manager 615 as described herein may be implemented to realize one or more potential advantages. One implementation may allow the device 605 to prioritize communications between the device 605 and a first subscription (e.g., communications over a first channel configured for a first base station) over communications between the device 605 and a second subscription (e.g., communications over a second channel configured for a second base station). Based on the techniques for prioritizing communications of a first subscription over a second subscription, the device 605 may reduce latency and interference associated with conflicting transmissions between subscriptions.

As such, the device 605 may avoid delays arising from retransmitting failed communications and, accordingly, may communicate over the first and second channels with a greater likelihood of successful communications. In some examples, based on a greater likelihood of successful communications, the device 605 may more efficiently power a processor or one or more processing units associated with communicating with multiple subscribers, which may enable the device to save power and increase battery life.

Figure 7:
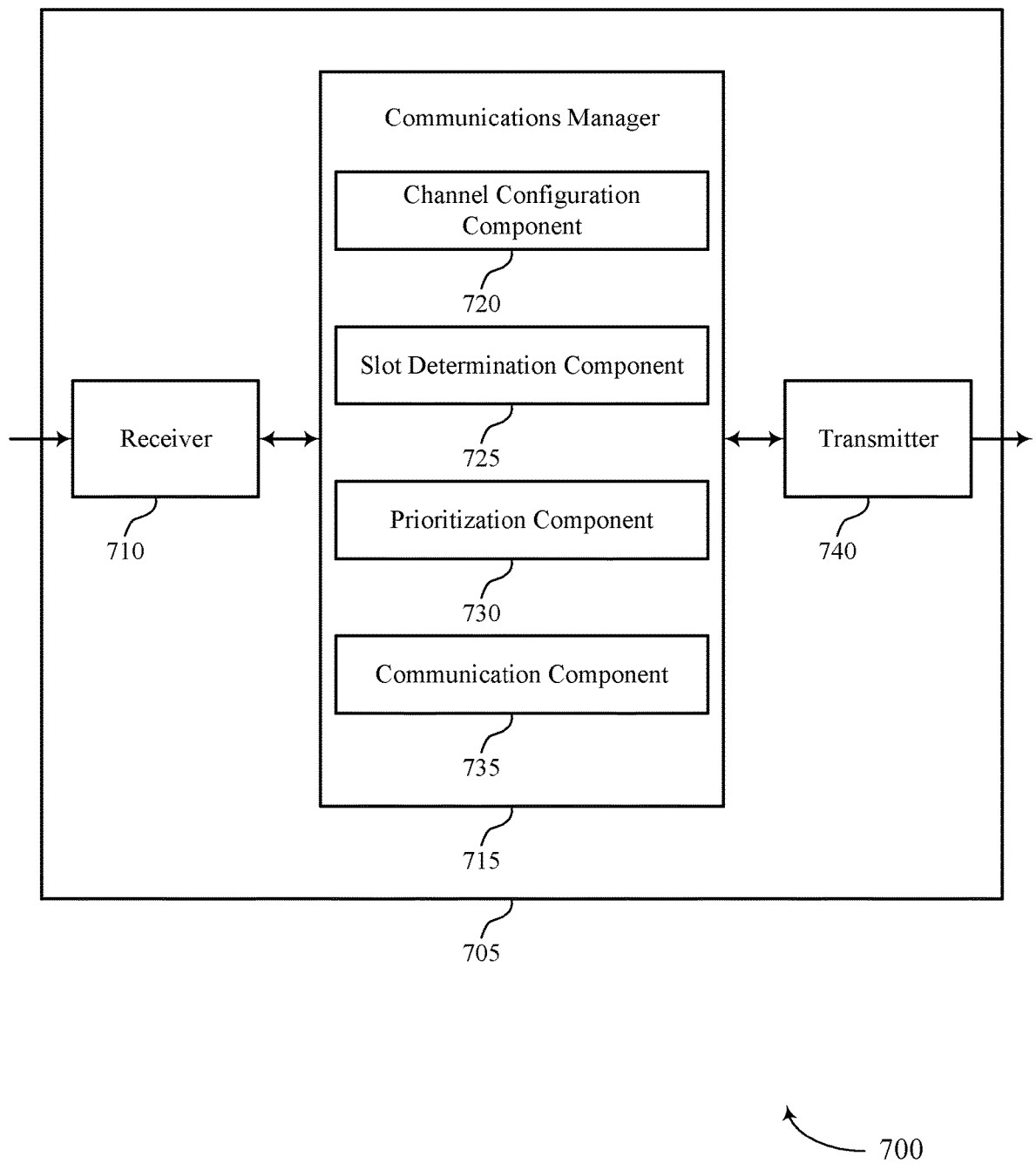

FIG. 7 shows a block diagram 700 of a device 705 that supports subscriber prioritization for devices with dual subscriptions in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to subscriber prioritization for devices with dual subscriptions, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a channel configuration component 720, a slot determination component 725, a prioritization component 730, and a communication component 735. The communications manager 715 may be an example of aspects of the communications manager 910 described herein.

The channel configuration component 720 may configure a first channel of the UE for a first subscription and a second channel of the UE for a second subscription.

The slot determination component 725 may determine one or more slots for the first subscription for communicating in a first direction and for the second subscription for communicating in a second direction, the first direction including one of an uplink direction or a downlink direction and the second direction including the other of the uplink direction or downlink direction different than the first direction.

The prioritization component 730 may prioritize communications of the first subscription in the one or more slots over communications of the second subscription based on the determining.

The communication component 735 may communicate in the first direction using the first channel in the one or more slots according to the first subscription based on the prioritizing.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
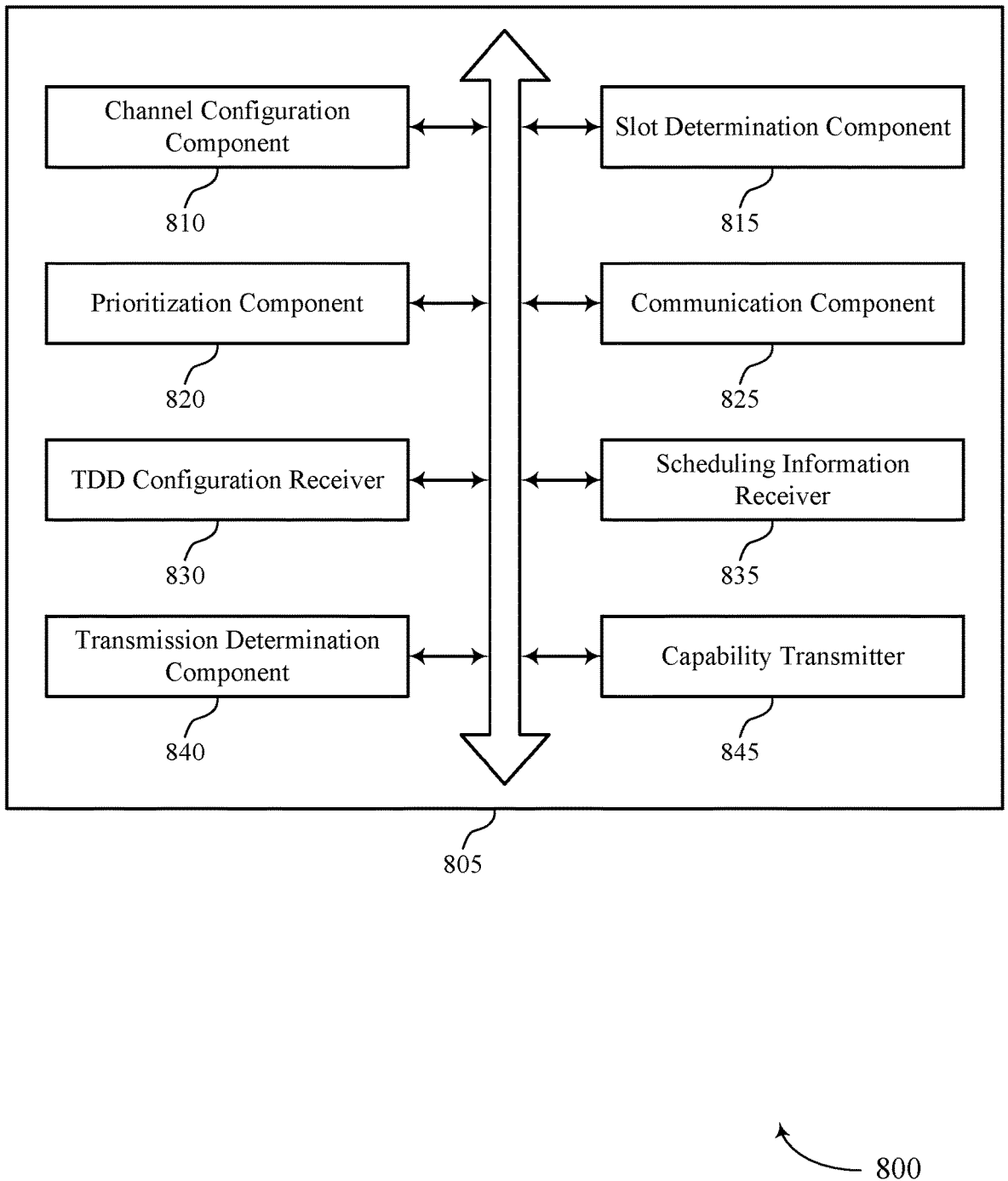
FIG. 8 shows a block diagram of a communications manager that supports subscriber prioritization for devices with dual subscriptions in accordance with aspects of the present disclosure.

FIG. 8 shows a block diagram 800 of a communications manager 805 that supports subscriber prioritization for devices with dual subscriptions in accordance with aspects of the present disclosure. The communications manager 805 may be an example of aspects of a communications manager 615, a communications manager 715, or a communications manager 910 described herein. The communications manager 805 may include a channel configuration component 810, a slot determination component 815, a prioritization component 820, a communication component 825, a TDD configuration receiver 830, a scheduling information receiver 835, a transmission determination component 840, and a capability transmitter 845. Each of these modules may communicate, directly or indirectly, with one another (e.g., via one or more buses).

The channel configuration component 810 may configure a first channel of the UE for a first subscription and a second channel of the UE for a second subscription.

The slot determination component 815 may determine one or more slots for the first subscription for communicating in a first direction and for the second subscription for communicating in a second direction, the first direction including one of an uplink direction or a downlink direction and the second direction including the other of the uplink direction or downlink direction different than the first direction.

In some examples, the slot determination component 815 may determine a difference between the first direction and the second direction for the one or more slots based in part on the time division duplex uplink-downlink configuration and the second time division duplex uplink-downlink configuration, where the prioritizing is based on the difference.

In some examples, the slot determination component 815 may determine a difference between the first direction and the second direction for the at least one slot based in part on the time division duplex uplink-downlink configuration and the transmission for the second subscription in the second direction, where the prioritizing is based on the difference.

In some examples, the slot determination component 815 may determine a difference between the first direction and the second direction for the at least one slot based in part on the time division duplex uplink-downlink configuration and the transmission for the first subscription in the first direction, where the prioritizing is based on the difference.

The prioritization component 820 may prioritize communications of the first subscription in the one or more slots over communications of the second subscription based on the determining.

In some examples, the prioritization component 820 may prioritize communications of the first subscription based on the monitoring occasion for the first subscription and the uplink transmission for the second subscription.

In some examples, the prioritization component 820 may prioritize communications of the first subscription based on the uplink transmission for the first subscription and the downlink transmission for the second subscription.

In some examples, the prioritization component 820 may prioritize communications of the first subscription based on the downlink transmission for the first subscription and the uplink transmission for the second subscription.

In some examples, the prioritization component 820 may transmit, to a base station supporting communications of the second subscription, a message indicating that communications of the first subscription in the one or more slots are prioritized over communications of the second subscription.

In some examples, the prioritization component 820 may prioritize communications of the first subscription in the one or more slots over communications of the second subscription based on the first subscription corresponding to a primary subscription of the UE and the second subscription corresponding to a second subscription of the UE.

In some examples, the prioritization component 820 may receive a prioritization configuration from a base station indicating that the first subscription is of higher priority than the second subscription, where the prioritizing is based on the prioritization configuration.

The communication component 825 may communicate in the first direction using the first channel in the one or more slots according to the first subscription based on the prioritizing.

In some examples, the communication component 825 may refrain from communicating in the second direction using the second channel in one or more slots according to the second subscription based on the prioritizing.

In some examples, the communication component 825 may communicate in the first direction in a half-duplex mode.

The TDD configuration receiver 830 may receive a time division duplex uplink-downlink configuration for the first subscription for a set of slots including the one or more slots, where determining the one or more slots is based on the time division duplex uplink-downlink configuration.

In some examples, the TDD configuration receiver 830 may receive a second time division duplex uplink-downlink configuration for the second subscription for a second set of slots including the one or more slots.

In some examples, the TDD configuration receiver 830 may receive a time division duplex uplink-downlink configuration for the second subscription for a set of slots including the one or more slots, where determining the one or more slots is based on the time division duplex uplink-downlink configuration.

The scheduling information receiver 835 may receive scheduling information indicating a transmission for the second subscription in the second direction via at least one slot of the one or more slots.

In some examples, the scheduling information receiver 835 may receive scheduling information indicating a transmission for the first subscription in the first direction via at least one slot of the one or more slots.

The transmission determination component 840 may determine a monitoring occasion for the second subscription in the one or more slots that at least partially overlaps in time with an uplink transmission for the first subscription in the one or more slots.

In some examples, the transmission determination component 840 may determine an uplink transmission for the second subscription in the one or more slots that at least partially overlaps in time with a monitoring occasion for the first subscription in the one or more slots.

In some examples, the transmission determination component 840 may determine a downlink transmission for the second subscription in the one or more slots that at least partially overlaps in time with an uplink transmission for the first subscription in the one or more slots.

In some examples, the transmission determination component 840 may determine an uplink transmission for the second subscription in the one or more slots that at least partially overlaps in time with a downlink transmission for the first subscription in the one or more slots.

In some cases, the uplink transmission for the first subscription is a semi-statically configured uplink transmission including one of a random access channel, an uplink control channel, an uplink shared channel, or a reference signal.

In some cases, the uplink transmission for the second subscription is a semi-statically configured uplink transmission including one of a random access channel, an uplink control channel, an uplink shared channel, or a reference signal.

The capability transmitter 845 may transmit, to a base station, a capability message indicating that the UE supports communications of the first subscription and communications of the second subscription.

Figure 9:
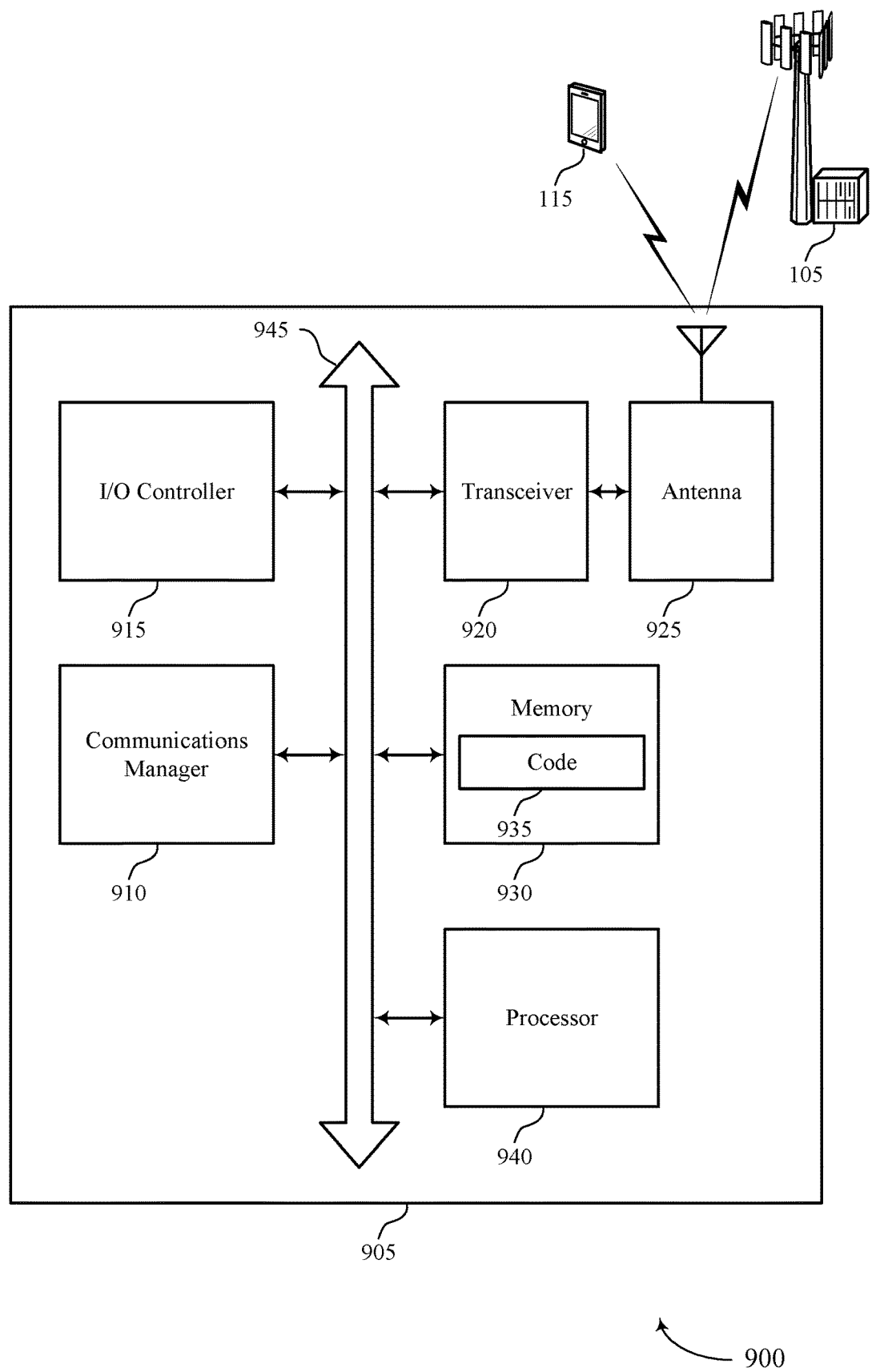
FIG. 9 shows a diagram of a system including a device that supports subscriber prioritization for devices with dual subscriptions in accordance with aspects of the present disclosure.

FIG. 9 shows a diagram of a system 900 including a device 905 that supports subscriber prioritization for devices with dual subscriptions in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may configure a first channel of the UE for a first subscription and a second channel of the UE for a second subscription. The communications manager 910 may determine one or more slots for the first subscription for communicating in a first direction and for the second subscription for communicating in a second direction, the first direction including one of an uplink direction or a downlink direction and the second direction including the other of the uplink direction or downlink direction different than the first direction. The communications manager 910 may prioritize communications of the first subscription in the one or more slots over communications of the second subscription based on the determining. The communications manager 910 may communicate in the first direction using the first channel in the one or more slots according to the first subscription based on the prioritizing.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random access memory (RAM) and read only memory (ROM). The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting subscriber prioritization for devices with dual subscriptions).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
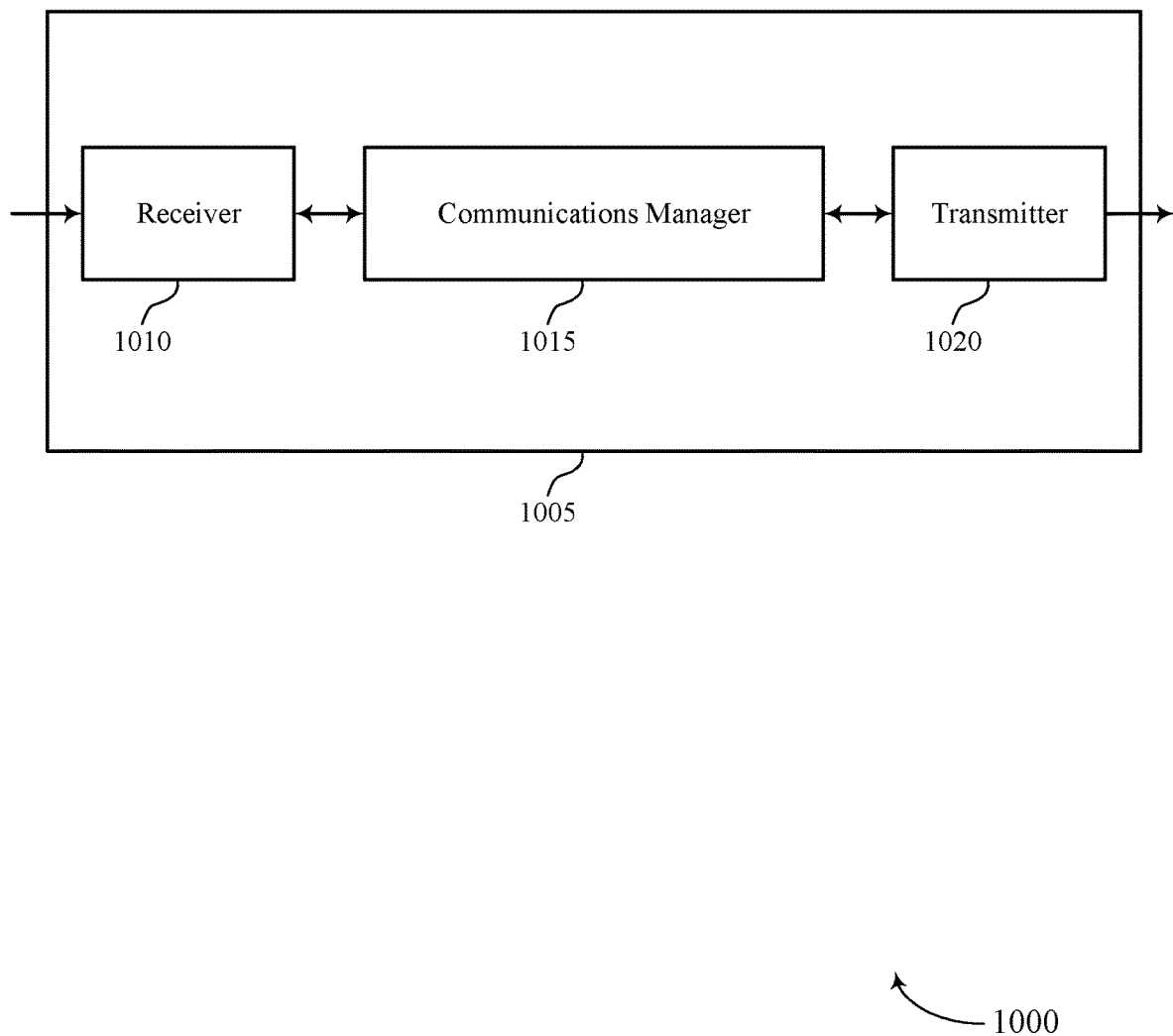
FIGS. 10 and 11 show block diagrams of devices that support subscriber prioritization for devices with dual subscriptions in accordance with aspects of the present disclosure.

FIG. 10 shows a block diagram 1000 of a device 1005 that supports subscriber prioritization for devices with dual subscriptions in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to subscriber prioritization for devices with dual subscriptions, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may configure a first channel of a UE for communications of a first subscription of the UE, receive, from the UE, a message indicating that communications of a second subscription of the UE in one or more slots are prioritized over communications of the first subscription, and transmit, to the UE, scheduling information for the first channel based on the message, the scheduling information indicating communications of the first subscription of the UE in at least one slot non-overlapping with the one or more slots. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
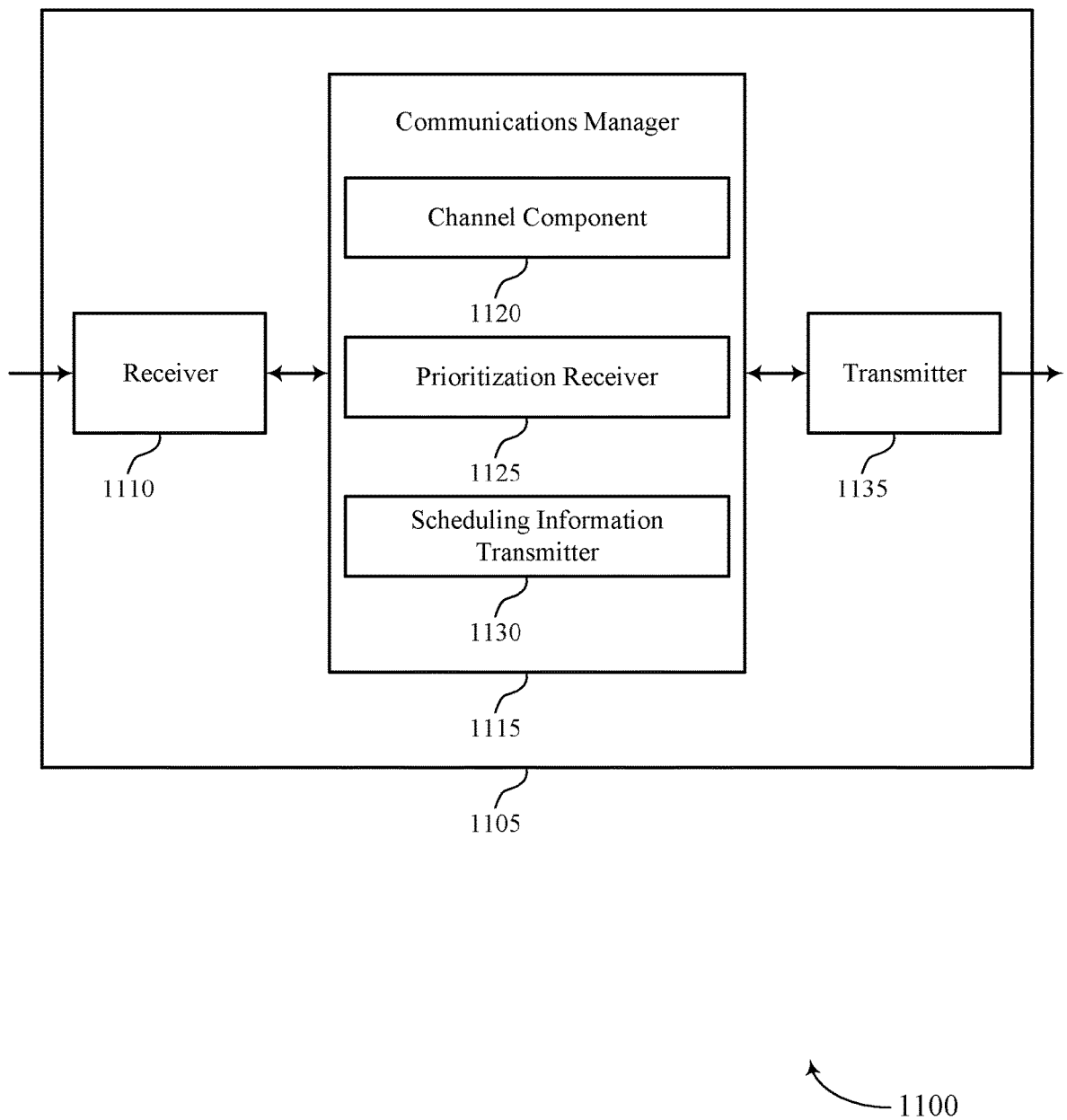

FIG. 11 shows a block diagram 1100 of a device 1105 that supports subscriber prioritization for devices with dual subscriptions in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to subscriber prioritization for devices with dual subscriptions, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a channel component 1120, a prioritization receiver 1125, and a scheduling information transmitter 1130. The communications manager 1115 may be an example of aspects of the communications manager 1310 described herein.

The channel component 1120 may configure a first channel of a UE for communications of a first subscription of the UE.

The prioritization receiver 1125 may receive, from the UE, a message indicating that communications of a second subscription of the UE in one or more slots are prioritized over communications of the first subscription.

The scheduling information transmitter 1130 may transmit, to the UE, scheduling information for the first channel based on the message, the scheduling information indicating communications of the first subscription of the UE in at least one slot non-overlapping with the one or more slots.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
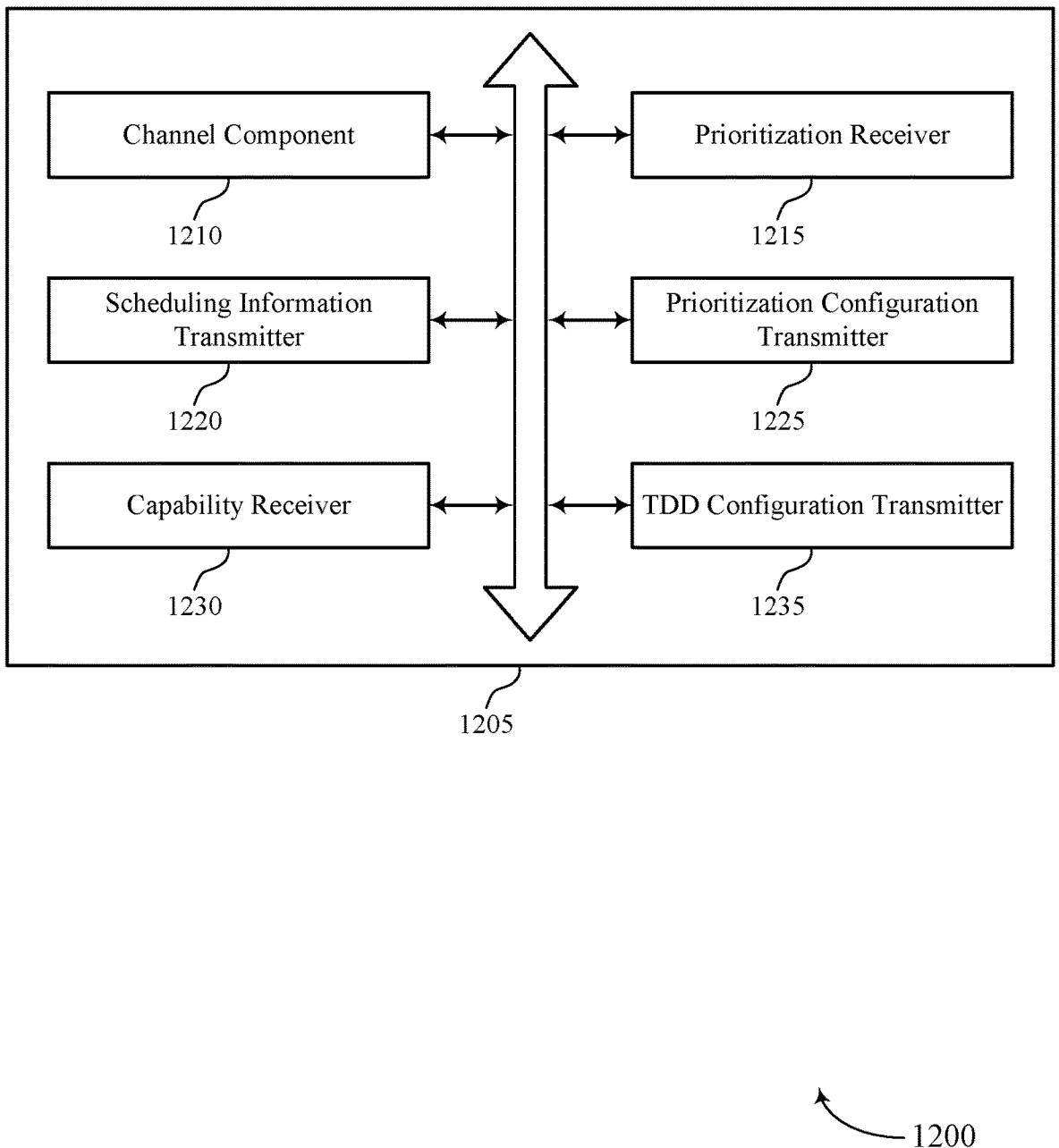
FIG. 12 shows a block diagram of a communications manager that supports subscriber prioritization for devices with dual subscriptions in accordance with aspects of the present disclosure.

FIG. 12 shows a block diagram 1200 of a communications manager 1205 that supports subscriber prioritization for devices with dual subscriptions in accordance with aspects of the present disclosure. The communications manager 1205 may be an example of aspects of a communications manager 1015, a communications manager 1115, or a communications manager 1310 described herein. The communications manager 1205 may include a channel component 1210, a prioritization receiver 1215, a scheduling information transmitter 1220, a prioritization configuration transmitter 1225, a capability receiver 1230, and a TDD configuration transmitter 1235. Each of these modules may communicate, directly or indirectly, with one another (e.g., via one or more buses).

The channel component 1210 may configure a first channel of a UE for communications of a first subscription of the UE.

The prioritization receiver 1215 may receive, from the UE, a message indicating that communications of a second subscription of the UE in one or more slots are prioritized over communications of the first subscription.

The scheduling information transmitter 1220 may transmit, to the UE, scheduling information for the first channel based on the message, the scheduling information indicating communications of the first subscription of the UE in at least one slot non-overlapping with the one or more slots.

The prioritization configuration transmitter 1225 may transmit a prioritization configuration to the UE indicating that the second subscription is of higher priority than the first subscription.

The capability receiver 1230 may receive, from the UE, a capability message indicating that the UE supports communications of the first subscription and communications of the second subscription.

The TDD configuration transmitter 1235 may transmit a time division duplex uplink-downlink configuration for the first subscription for a set of slots including the one or more slots based on the message, where the time division duplex uplink-downlink configuration modifies a communication direction of the first subscription in the one or more slots.

Figure 13:
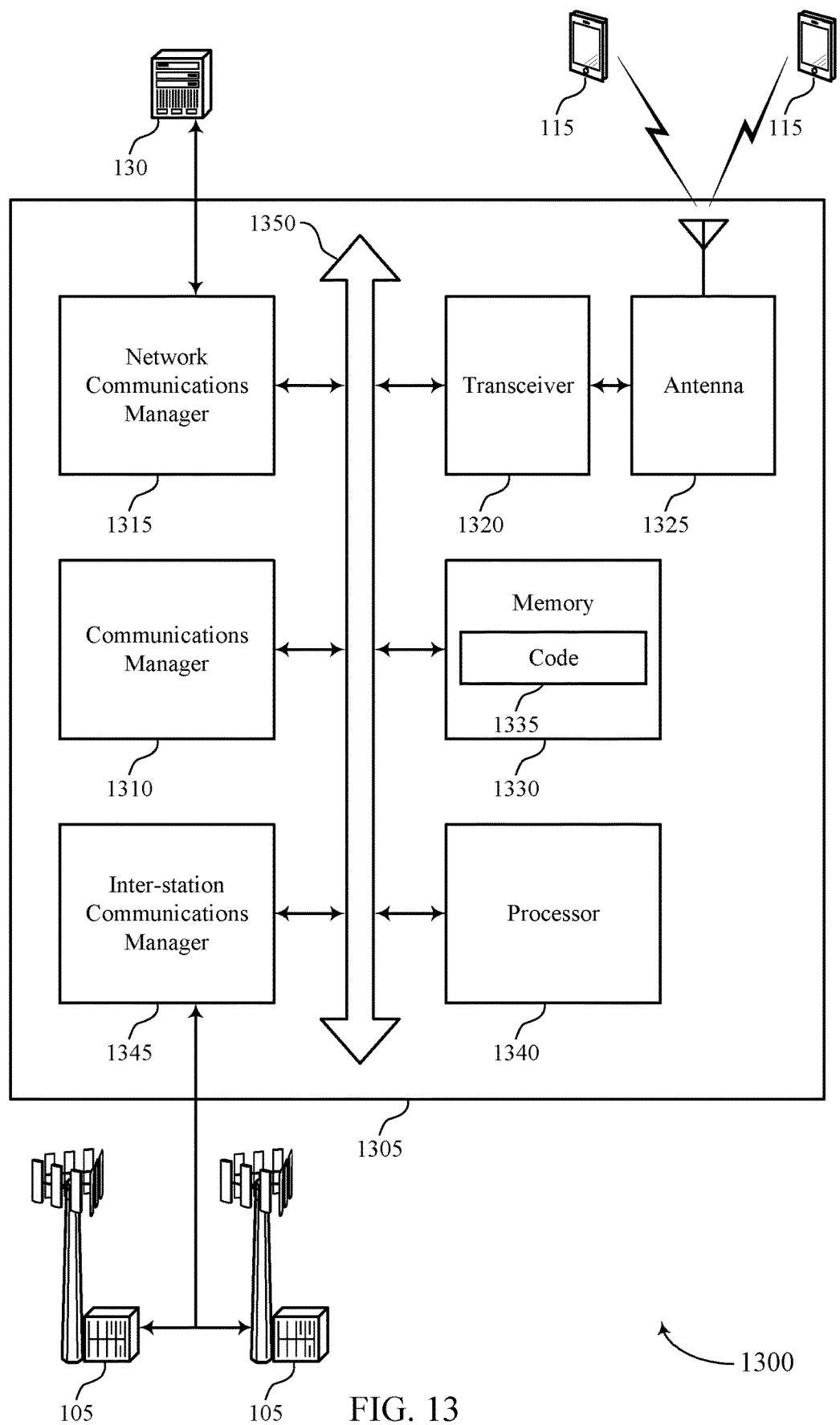
FIG. 13 shows a diagram of a system including a device that supports subscriber prioritization for devices with dual subscriptions in accordance with aspects of the present disclosure.

FIG. 13 shows a diagram of a system 1300 including a device 1305 that supports subscriber prioritization for devices with dual subscriptions in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may configure a first channel of a UE for communications of a first subscription of the UE. The communications manager 1310 may receive, from the UE, a message indicating that communications of a second subscription of the UE in one or more slots are prioritized over communications of the first subscription. The communications manager 1310 may transmit, to the UE, scheduling information for the first channel based on the message, the scheduling information indicating communications of the first subscription of the UE in at least one slot non-overlapping with the one or more slots.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting subscriber prioritization for devices with dual subscriptions).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
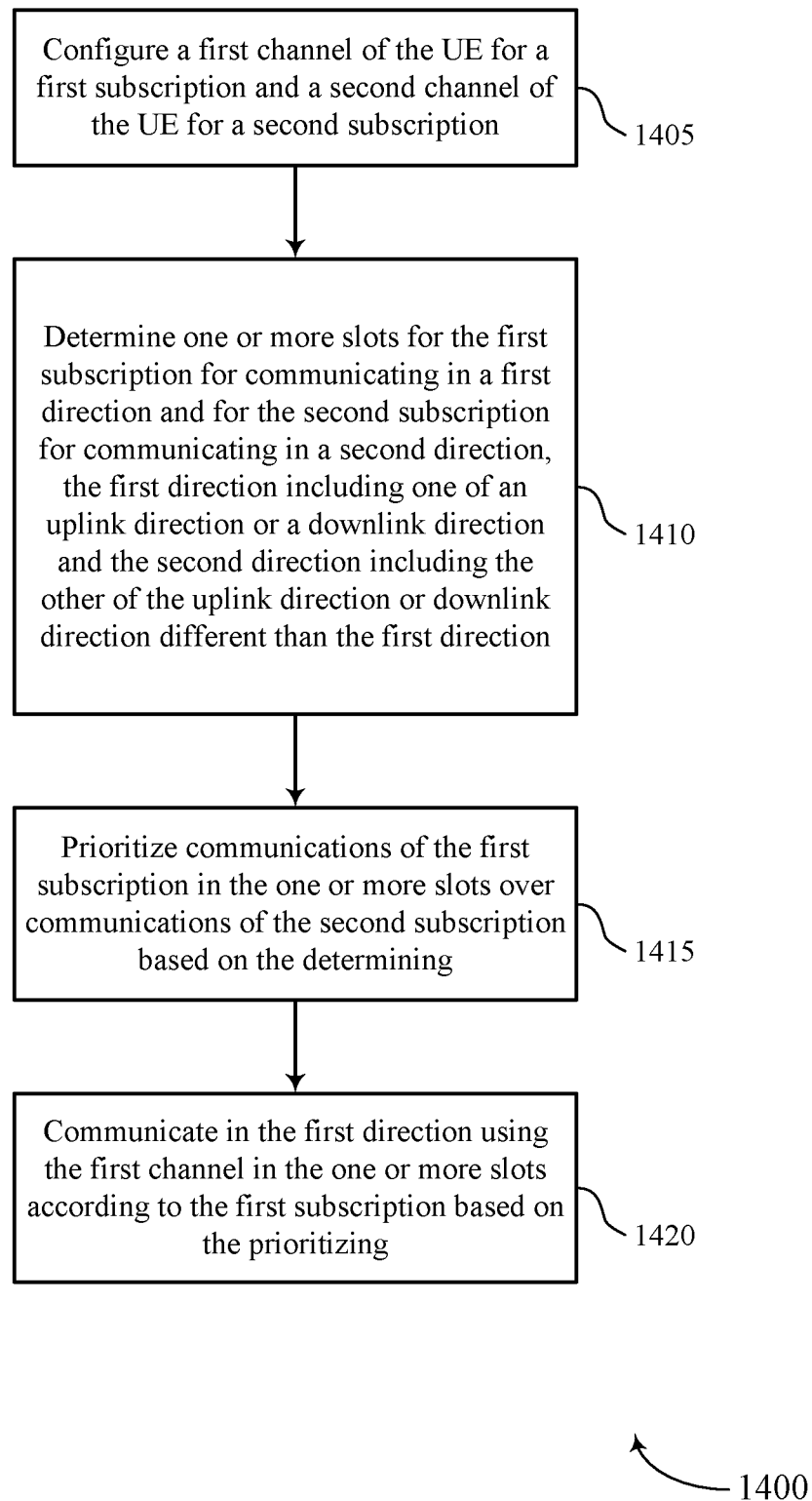
FIGS. 14 through 21 show flowcharts illustrating methods that support subscriber prioritization for devices with dual subscriptions in accordance with aspects of the present disclosure.

FIG. 14 shows a flowchart illustrating a method 1400 that supports subscriber prioritization for devices with dual subscriptions in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may configure a first channel of the UE for a first subscription and a second channel of the UE for a second subscription. The operations of 1405 may be performed according to the methods described herein. In some examples, aspects of the operations of 1405 may be performed by a channel configuration component as described with reference to FIGS. 6 through 9.

At 1410, the UE may determine one or more slots for the first subscription for communicating in a first direction and for the second subscription for communicating in a second direction, the first direction including one of an uplink direction or a downlink direction and the second direction including the other of the uplink direction or downlink direction different than the first direction. The operations of 1410 may be performed according to the methods described herein. In some examples, aspects of the operations of 1410 may be performed by a slot determination component as described with reference to FIGS. 6 through 9.

At 1415, the UE may prioritize communications of the first subscription in the one or more slots over communications of the second subscription based on the determining. The operations of 1415 may be performed according to the methods described herein. In some examples, aspects of the operations of 1415 may be performed by a prioritization component as described with reference to FIGS. 6 through 9.

At 1420, the UE may communicate in the first direction using the first channel in the one or more slots according to the first subscription based on the prioritizing. The operations of 1420 may be performed according to the methods described herein. In some examples, aspects of the operations of 1420 may be performed by a communication component as described with reference to FIGS. 6 through 9.

Figure 15:
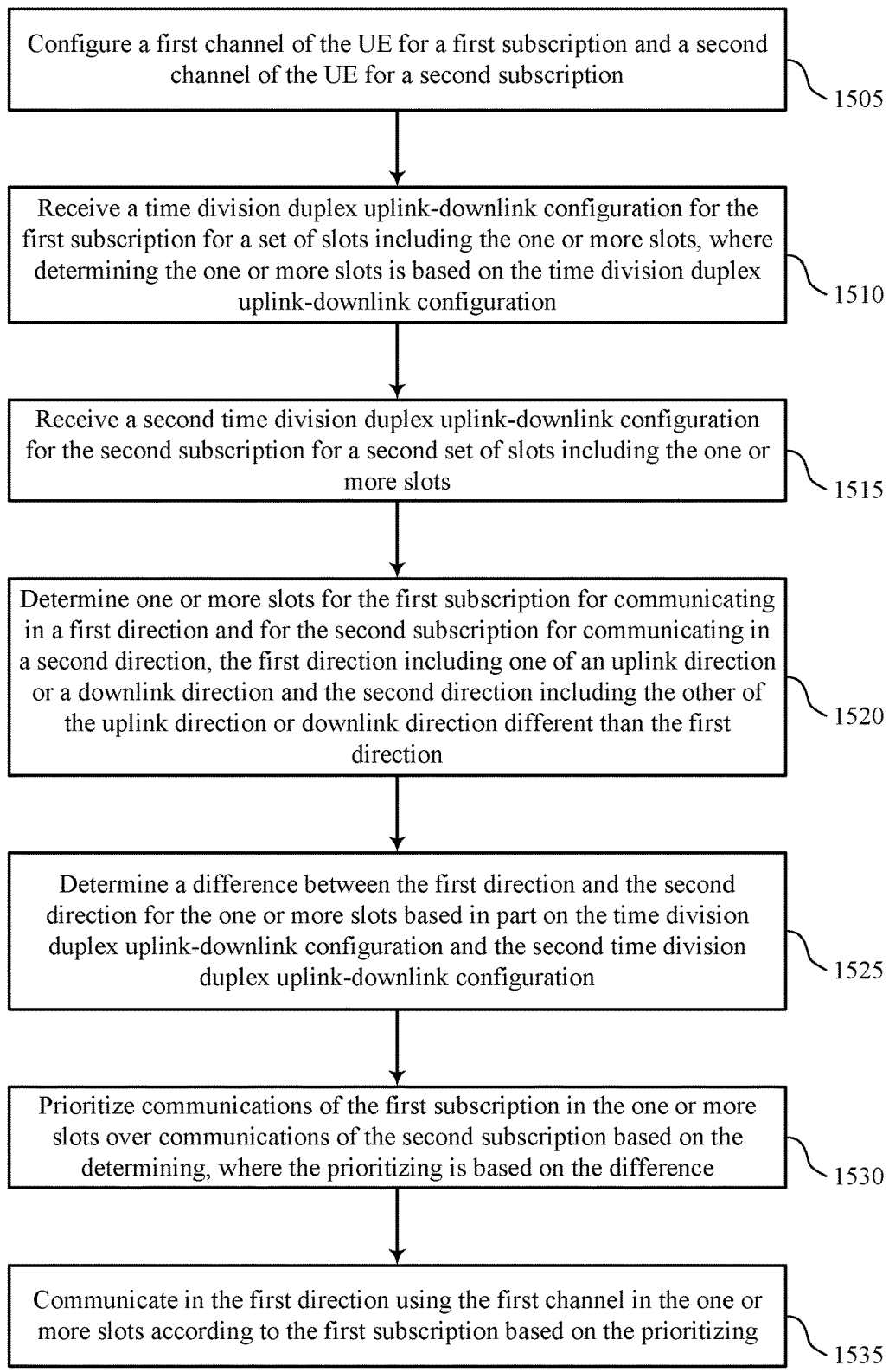

FIG. 15 shows a flowchart illustrating a method 1500 that supports subscriber prioritization for devices with dual subscriptions in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may configure a first channel of the UE for a first subscription and a second channel of the UE for a second subscription. The operations of 1505 may be performed according to the methods described herein. In some examples, aspects of the operations of 1505 may be performed by a channel configuration component as described with reference to FIGS. 6 through 9.

At 1510, the UE may receive a time division duplex uplink-downlink configuration for the first subscription for a set of slots including the one or more slots, where determining the one or more slots is based on the time division duplex uplink-downlink configuration. The operations of 1510 may be performed according to the methods described herein. In some examples, aspects of the operations of 1510 may be performed by a TDD configuration receiver as described with reference to FIGS. 6 through 9.

At 1515, the UE may receive a second time division duplex uplink-downlink configuration for the second subscription for a second set of slots including the one or more slots. The operations of 1515 may be performed according to the methods described herein. In some examples, aspects of the operations of 1515 may be performed by a TDD configuration receiver as described with reference to FIGS. 6 through 9.

At 1520, the UE may determine one or more slots for the first subscription for communicating in a first direction and for the second subscription for communicating in a second direction, the first direction including one of an uplink direction or a downlink direction and the second direction including the other of the uplink direction or downlink direction different than the first direction. The operations of 1520 may be performed according to the methods described herein. In some examples, aspects of the operations of 1520 may be performed by a slot determination component as described with reference to FIGS. 6 through 9.

At 1525, the UE may determine a difference between the first direction and the second direction for the one or more slots based in part on the time division duplex uplink-downlink configuration and the second time division duplex uplink-downlink configuration. The operations of 1525 may be performed according to the methods described herein. In some examples, aspects of the operations of 1525 may be performed by a slot determination component as described with reference to FIGS. 6 through 9.

At 1530, the UE may prioritize communications of the first subscription in the one or more slots over communications of the second subscription based on the determining, where the prioritizing is based on the difference. The operations of 1530 may be performed according to the methods described herein. In some examples, aspects of the operations of 1530 may be performed by a prioritization component as described with reference to FIGS. 6 through 9.

At 1535, the UE may communicate in the first direction using the first channel in the one or more slots according to the first subscription based on the prioritizing. The operations of 1535 may be performed according to the methods described herein. In some examples, aspects of the operations of 1535 may be performed by a communication component as described with reference to FIGS. 6 through 9.

Figure 16:
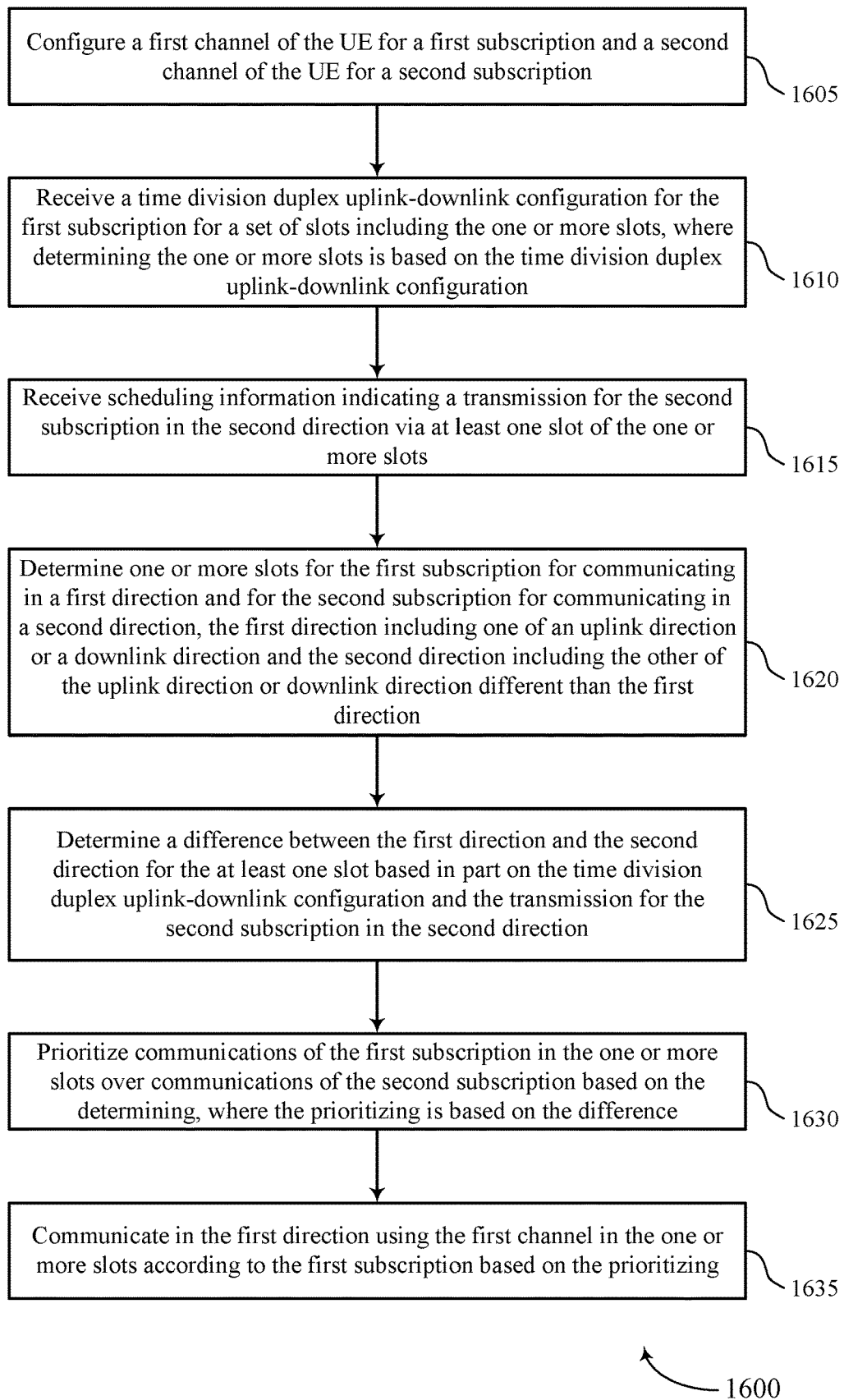

FIG. 16 shows a flowchart illustrating a method 1600 that supports subscriber prioritization for devices with dual subscriptions in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1605, the UE may configure a first channel of the UE for a first subscription and a second channel of the UE for a second subscription. The operations of 1605 may be performed according to the methods described herein. In some examples, aspects of the operations of 1605 may be performed by a channel configuration component as described with reference to FIGS. 6 through 9.

At 1610, the UE may receive a time division duplex uplink-downlink configuration for the first subscription for a set of slots including the one or more slots, where determining the one or more slots is based on the time division duplex uplink-downlink configuration. The operations of 1610 may be performed according to the methods described herein. In some examples, aspects of the operations of 1610 may be performed by a TDD configuration receiver as described with reference to FIGS. 6 through 9.

At 1615, the UE may receive scheduling information indicating a transmission for the second subscription in the second direction via at least one slot of the one or more slots. The operations of 1615 may be performed according to the methods described herein. In some examples, aspects of the operations of 1615 may be performed by a scheduling information receiver as described with reference to FIGS. 6 through 9.

At 1620, the UE may determine one or more slots for the first subscription for communicating in a first direction and for the second subscription for communicating in a second direction, the first direction including one of an uplink direction or a downlink direction and the second direction including the other of the uplink direction or downlink direction different than the first direction. The operations of 1620 may be performed according to the methods described herein. In some examples, aspects of the operations of 1620 may be performed by a slot determination component as described with reference to FIGS. 6 through 9.

At 1625, the UE may determine a difference between the first direction and the second direction for the at least one slot based in part on the time division duplex uplink-downlink configuration and the transmission for the second subscription in the second direction. The operations of 1625 may be performed according to the methods described herein. In some examples, aspects of the operations of 1625 may be performed by a slot determination component as described with reference to FIGS. 6 through 9.

At 1630, the UE may prioritize communications of the first subscription in the one or more slots over communications of the second subscription based on the determining, where the prioritizing is based on the difference. The operations of 1630 may be performed according to the methods described herein. In some examples, aspects of the operations of 1630 may be performed by a prioritization component as described with reference to FIGS. 6 through 9.

At 1635, the UE may communicate in the first direction using the first channel in the one or more slots according to the first subscription based on the prioritizing. The operations of 1635 may be performed according to the methods described herein. In some examples, aspects of the operations of 1635 may be performed by a communication component as described with reference to FIGS. 6 through 9.

Figure 17:
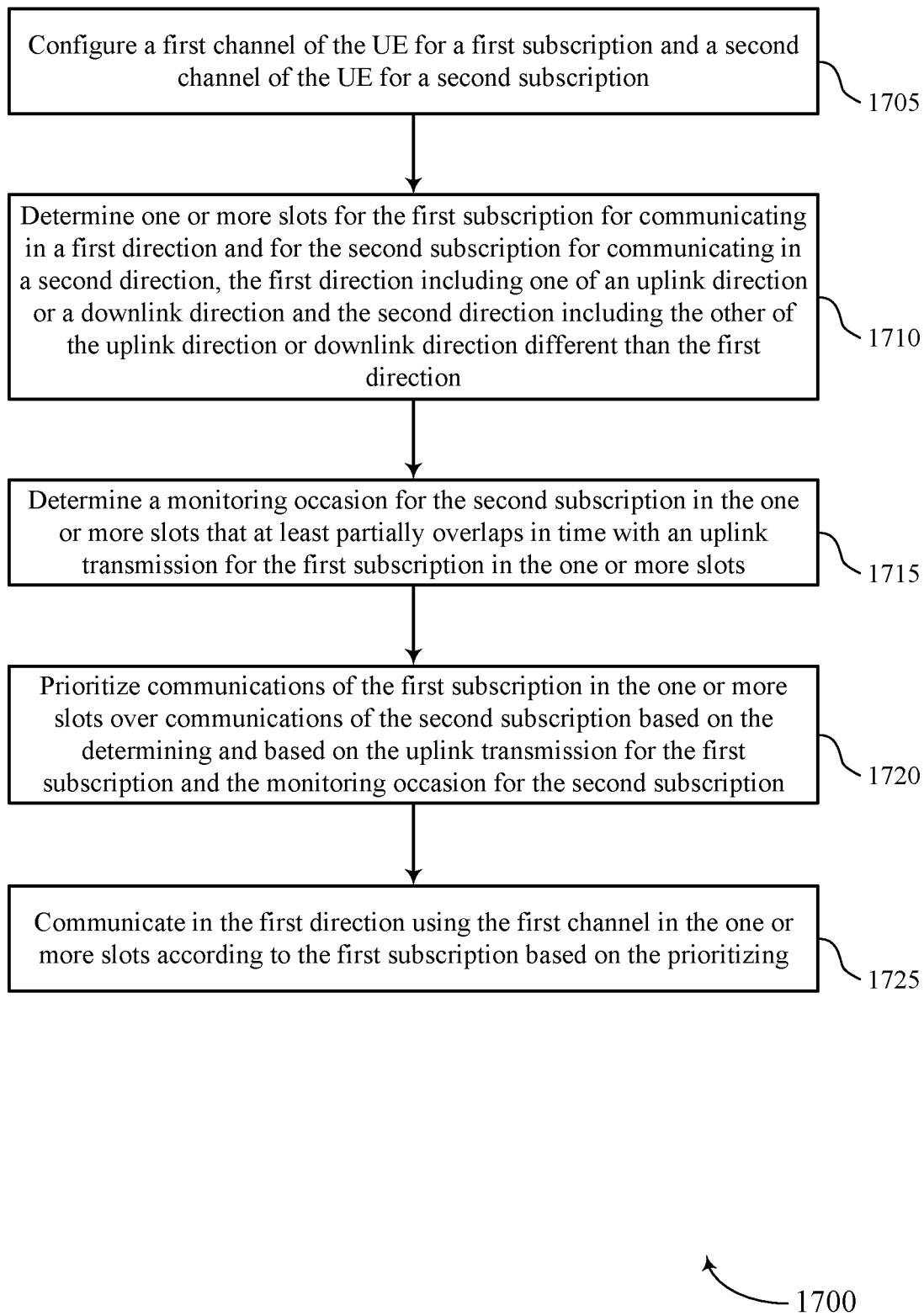

FIG. 17 shows a flowchart illustrating a method 1700 that supports subscriber prioritization for devices with dual subscriptions in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1705, the UE may configure a first channel of the UE for a first subscription and a second channel of the UE for a second subscription. The operations of 1705 may be performed according to the methods described herein. In some examples, aspects of the operations of 1705 may be performed by a channel configuration component as described with reference to FIGS. 6 through 9.

At 1710, the UE may determine one or more slots for the first subscription for communicating in a first direction and for the second subscription for communicating in a second direction, the first direction including one of an uplink direction or a downlink direction and the second direction including the other of the uplink direction or downlink direction different than the first direction. The operations of 1710 may be performed according to the methods described herein. In some examples, aspects of the operations of 1710 may be performed by a slot determination component as described with reference to FIGS. 6 through 9.

At 1715, the UE may determine a monitoring occasion for the second subscription in the one or more slots that at least partially overlaps in time with an uplink transmission for the first subscription in the one or more slots. The operations of 1715 may be performed according to the methods described herein. In some examples, aspects of the operations of 1715 may be performed by a transmission determination component as described with reference to FIGS. 6 through 9.

At 1720, the UE may prioritize communications of the first subscription in the one or more slots over communications of the second subscription based on the determining and based on the uplink transmission for the first subscription and the monitoring occasion for the second subscription. The operations of 1720 may be performed according to the methods described herein. In some examples, aspects of the operations of 1720 may be performed by a prioritization component as described with reference to FIGS. 6 through 9.

At 1725, the UE may communicate in the first direction using the first channel in the one or more slots according to the first subscription based on the prioritizing. The operations of 1725 may be performed according to the methods described herein. In some examples, aspects of the operations of 1725 may be performed by a communication component as described with reference to FIGS. 6 through 9.

Figure 18:
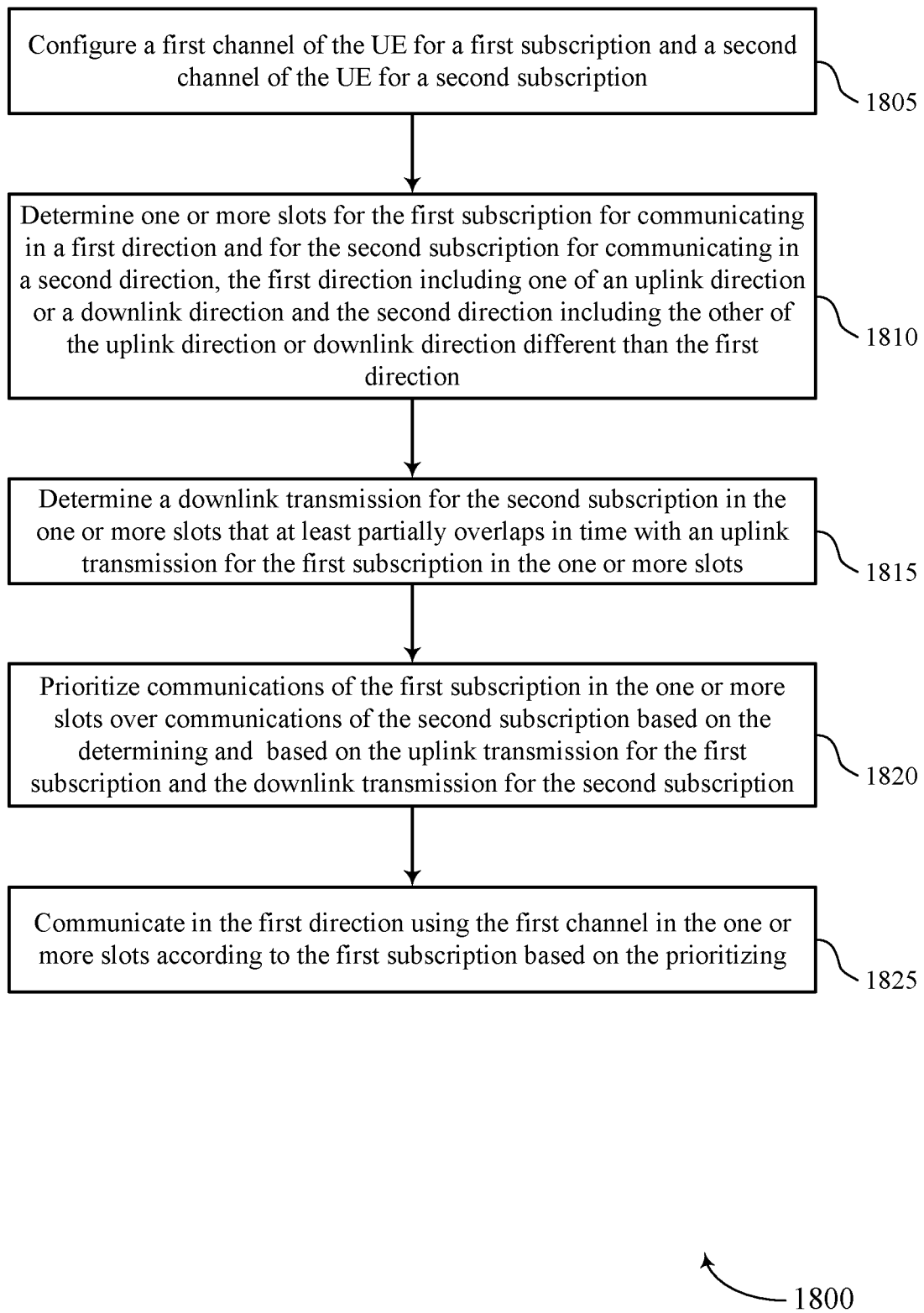

FIG. 18 shows a flowchart illustrating a method 1800 that supports subscriber prioritization for devices with dual subscriptions in accordance with aspects of the present disclosure. The operations of method 1800 may be implemented by a UE 115 or its components as described herein. For example, the operations of method 1800 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1805, the UE may configure a first channel of the UE for a first subscription and a second channel of the UE for a second subscription. The operations of 1805 may be performed according to the methods described herein. In some examples, aspects of the operations of 1805 may be performed by a channel configuration component as described with reference to FIGS. 6 through 9.

At 1810, the UE may determine one or more slots for the first subscription for communicating in a first direction and for the second subscription for communicating in a second direction, the first direction including one of an uplink direction or a downlink direction and the second direction including the other of the uplink direction or downlink direction different than the first direction. The operations of 1810 may be performed according to the methods described herein. In some examples, aspects of the operations of 1810 may be performed by a slot determination component as described with reference to FIGS. 6 through 9.

At 1815, the UE may determine a downlink transmission for the second subscription in the one or more slots that at least partially overlaps in time with an uplink transmission for the first subscription in the one or more slots. The operations of 1815 may be performed according to the methods described herein. In some examples, aspects of the operations of 1815 may be performed by a transmission determination component as described with reference to FIGS. 6 through 9.

At 1820, the UE may prioritize communications of the first subscription in the one or more slots over communications of the second subscription based on the determining and based on the uplink transmission for the first subscription and the downlink transmission for the second subscription. The operations of 1820 may be performed according to the methods described herein. In some examples, aspects of the operations of 1820 may be performed by a prioritization component as described with reference to FIGS. 6 through 9.

At 1825, the UE may communicate in the first direction using the first channel in the one or more slots according to the first subscription based on the prioritizing. The operations of 1825 may be performed according to the methods described herein. In some examples, aspects of the operations of 1825 may be performed by a communication component as described with reference to FIGS. 6 through 9.

Figure 19:
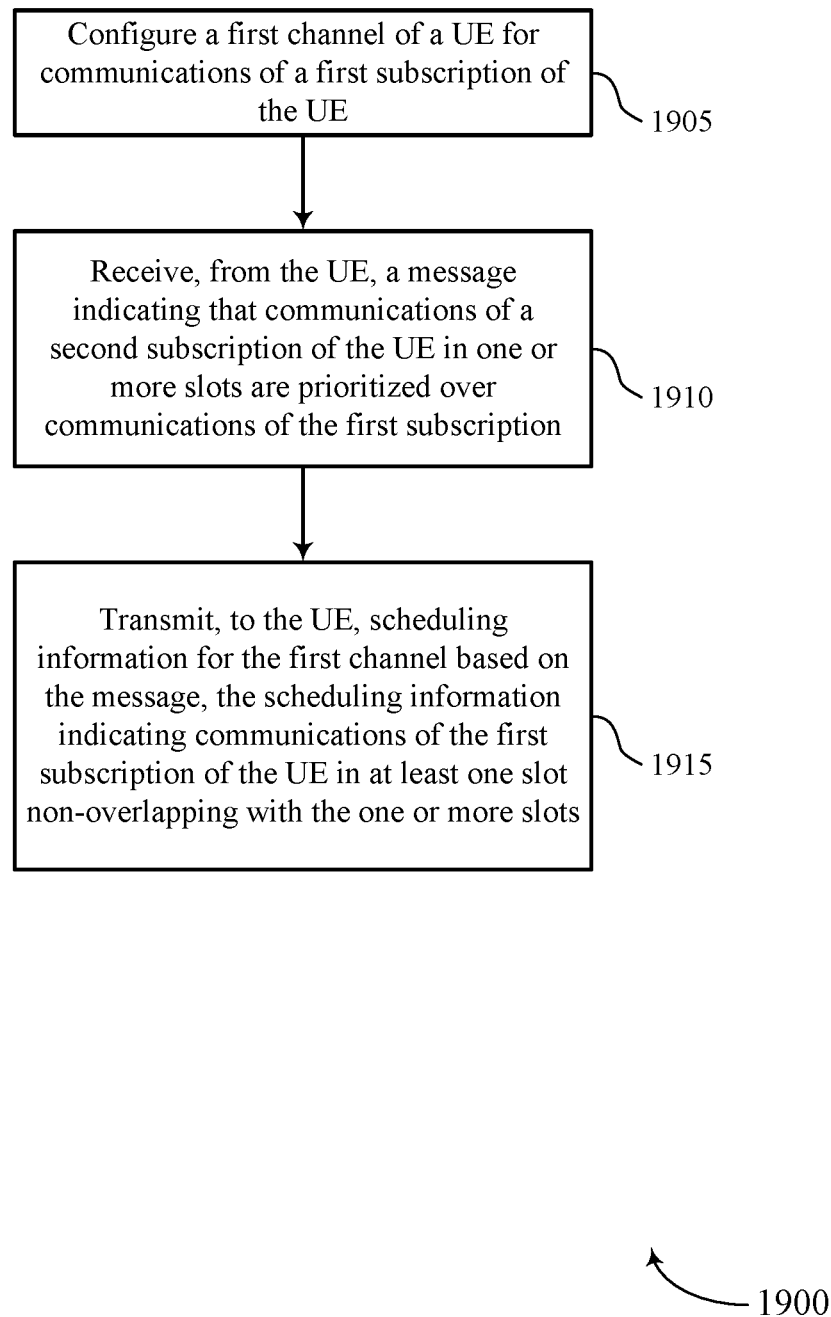

FIG. 19 shows a flowchart illustrating a method 1900 that supports subscriber prioritization for devices with dual subscriptions in accordance with aspects of the present disclosure. The operations of method 1900 may be implemented by a base station 105 or its components as described herein.

For example, the operations of method 1900 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1905, the base station may configure a first channel of a UE for communications of a first subscription of the UE. The operations of 1905 may be performed according to the methods described herein. In some examples, aspects of the operations of 1905 may be performed by a channel component as described with reference to FIGS. 10 through 13.

At 1910, the base station may receive, from the UE, a message indicating that communications of a second subscription of the UE in one or more slots are prioritized over communications of the first subscription. The operations of 1910 may be performed according to the methods described herein. In some examples, aspects of the operations of 1910 may be performed by a prioritization receiver as described with reference to FIGS. 10 through 13.

At 1915, the base station may transmit, to the UE, scheduling information for the first channel based on the message, the scheduling information indicating communications of the first subscription of the UE in at least one slot non-overlapping with the one or more slots. The operations of 1915 may be performed according to the methods described herein. In some examples, aspects of the operations of 1915 may be performed by a scheduling information transmitter as described with reference to FIGS. 10 through 13.

Figure 20:
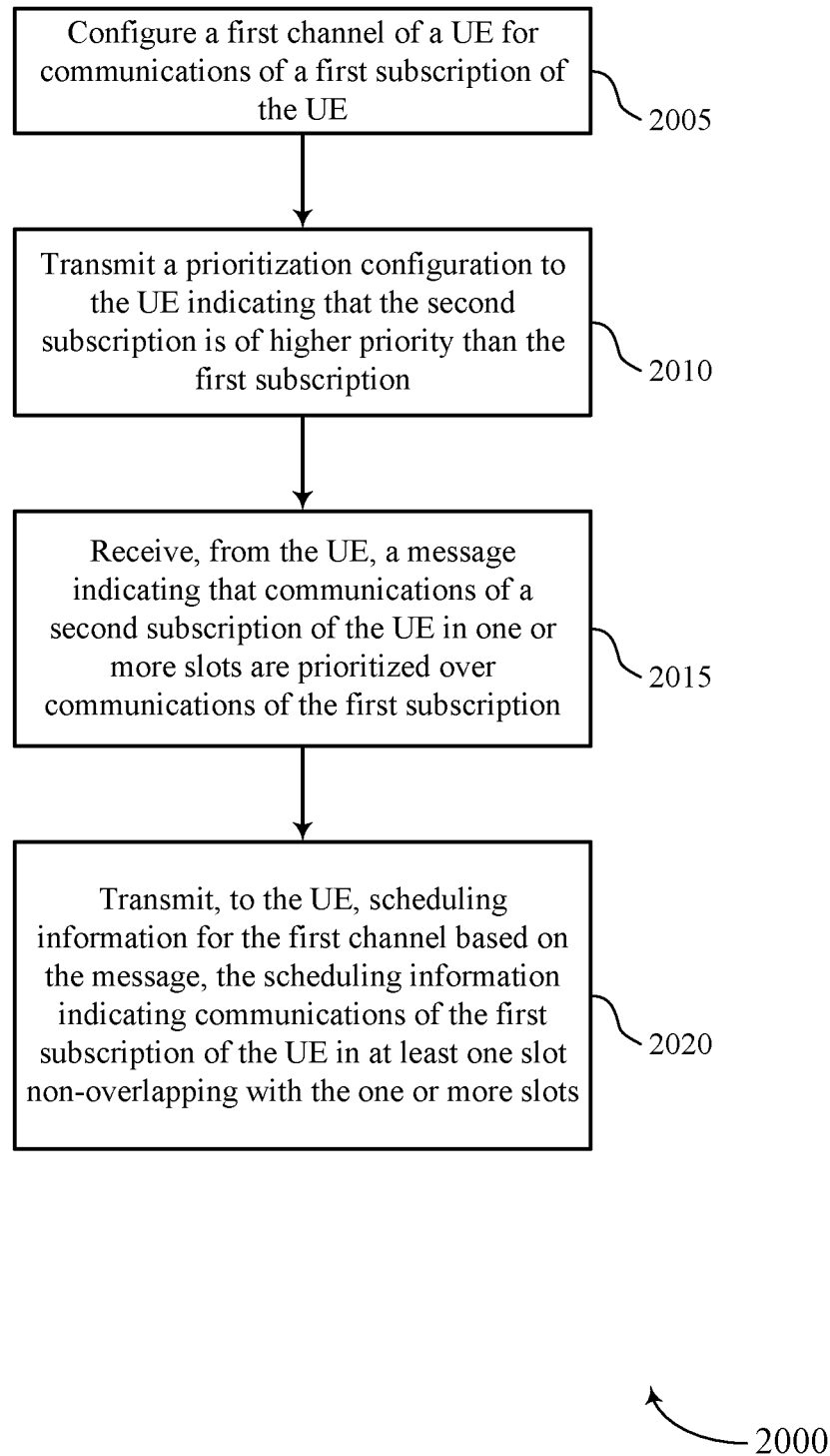

FIG. 20 shows a flowchart illustrating a method 2000 that supports subscriber prioritization for devices with dual subscriptions in accordance with aspects of the present disclosure. The operations of method 2000 may be implemented by a base station 105 or its components as described herein. For example, the operations of method 2000 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 2005, the base station may configure a first channel of a UE for communications of a first subscription of the UE. The operations of 2005 may be performed according to the methods described herein. In some examples, aspects of the operations of 2005 may be performed by a channel component as described with reference to FIGS. 10 through 13.

At 2010, the base station may transmit a prioritization configuration to the UE indicating that the second subscription is of higher priority than the first subscription. The operations of 2010 may be performed according to the methods described herein. In some examples, aspects of the operations of 2010 may be performed by a prioritization configuration transmitter as described with reference to FIGS. 10 through 13.

At 2015, the base station may receive, from the UE, a message indicating that communications of a second subscription of the UE in one or more slots are prioritized over communications of the first subscription. The operations of 2015 may be performed according to the methods described herein. In some examples, aspects of the operations of 2015 may be performed by a prioritization receiver as described with reference to FIGS. 10 through 13.

At 2020, the base station may transmit, to the UE, scheduling information for the first channel based on the message, the scheduling information indicating communications of the first subscription of the UE in at least one slot non-overlapping with the one or more slots. The operations of 2020 may be performed according to the methods described herein. In some examples, aspects of the operations of 2020 may be performed by a scheduling information transmitter as described with reference to FIGS. 10 through 13.

Figure 21:
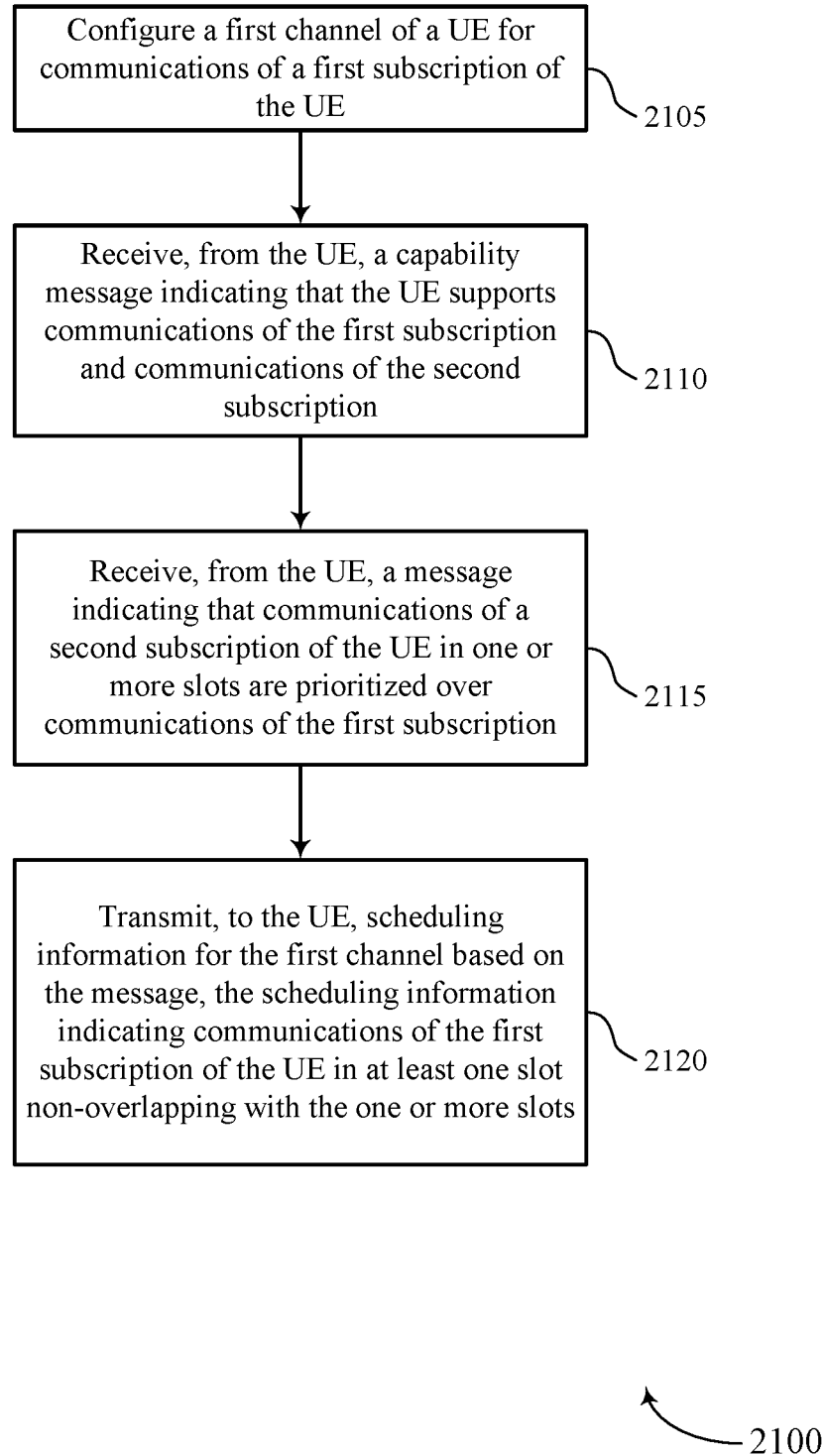

FIG. 21 shows a flowchart illustrating a method 2100 that supports subscriber prioritization for devices with dual subscriptions in accordance with aspects of the present disclosure. The operations of method 2100 may be implemented by a base station 105 or its components as described herein. For example, the operations of method 2100 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 2105, the base station may configure a first channel of a UE for communications of a first subscription of the UE. The operations of 2105 may be performed according to the methods described herein. In some examples, aspects of the operations of 2105 may be performed by a channel component as described with reference to FIGS. 10 through 13.

At 2110, the base station may receive, from the UE, a capability message indicating that the UE supports communications of the first subscription and communications of the second subscription. The operations of 2110 may be performed according to the methods described herein. In some examples, aspects of the operations of 2110 may be performed by a capability receiver as described with reference to FIGS. 10 through 13.

At 2115, the base station may receive, from the UE, a message indicating that communications of a second subscription of the UE in one or more slots are prioritized over communications of the first subscription. The operations of 2115 may be performed according to the methods described herein. In some examples, aspects of the operations of 2115 may be performed by a prioritization receiver as described with reference to FIGS. 10 through 13.

At 2120, the base station may transmit, to the UE, scheduling information for the first channel based on the message, the scheduling information indicating communications of the first subscription of the UE in at least one slot non-overlapping with the one or more slots. The operations of 2120 may be performed according to the methods described herein. In some examples, aspects of the operations of 2120 may be performed by a scheduling information transmitter as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    configuring a first channel of the UE for a first subscription and a second channel of the UE for a second subscription;
    determining one or more slots for the first subscription for communicating in a first direction and for the second subscription for communicating in a second direction, the first direction comprising one of an uplink direction or a downlink direction and the second direction comprising the other of the uplink direction or downlink direction different than the first direction;
    prioritizing communications of the first subscription in the one or more slots over communications of the second subscription based at least in part on the determining; and communicating in the first direction using the first channel in the one or more slots according to the first subscription based at least in part on the prioritizing.

2. The method of claim 1, further comprising:
receiving a time division duplex uplink-downlink configuration for the first subscription for a set of slots including the one or more slots, wherein determining the one or more slots is based at least in part on the time division duplex uplink-downlink configuration.

3. The method of claim 2, further comprising:
receiving a second time division duplex uplink-downlink configuration for the second subscription for a second set of slots including the one or more slots; and
determining a difference between the first direction and the second direction for the one or more slots based in part on the time division duplex uplink-downlink configuration and the second time division duplex uplink-downlink configuration, wherein the prioritizing is based at least in part on the difference.

4. The method of claim 2, further comprising:
receiving scheduling information indicating a transmission for the second subscription in the second direction via at least one slot of the one or more slots; and
determining a difference between the first direction and the second direction for the at least one slot based in part on the time division duplex uplink-downlink configuration and the transmission for the second subscription in the second direction, wherein the prioritizing is based at least in part on the difference.

5. The method of claim 1, further comprising:
receiving a time division duplex uplink-downlink configuration for the second subscription for a set of slots including the one or more slots, wherein determining the one or more slots is based at least in part on the time division duplex uplink-downlink configuration.

6. The method of claim 5, further comprising:
receiving scheduling information indicating a transmission for the first subscription in the first direction via at least one slot of the one or more slots; and
determining a difference between the first direction and the second direction for the at least one slot based in part on the time division duplex uplink-downlink configuration and the transmission for the first subscription in the first direction, wherein the prioritizing is based at least in part on the difference.

7. The method of claim 1, further comprising:
determining a monitoring occasion for the second subscription in the one or more slots that at least partially overlaps in time with an uplink transmission for the first subscription in the one or more slots; and
prioritizing communications of the first subscription based at least in part on the uplink transmission for the first subscription and the monitoring occasion for the second subscription.

8. The method of claim 7, wherein the uplink transmission for the first subscription is a semi-statically configured uplink transmission comprising one of a random access channel, an uplink control channel, an uplink shared channel, or a reference signal.

9. The method of claim 1, further comprising:
determining an uplink transmission for the second subscription in the one or more slots that at least partially overlaps in time with a monitoring occasion for the first subscription in the one or more slots; and
prioritizing communications of the first subscription based at least in part on the monitoring occasion for the first subscription and the uplink transmission for the second subscription.

10. The method of claim 9, wherein the uplink transmission for the second subscription is a semi-statically configured uplink transmission comprising one of a random access channel, an uplink control channel, an uplink shared channel, or a reference signal.

11. The method of claim 1, further comprising:
determining a downlink transmission for the second subscription in the one or more slots that at least partially overlaps in time with an uplink transmission for the first subscription in the one or more slots; and
prioritizing communications of the first subscription based at least in part on the uplink transmission for the first subscription and the downlink transmission for the second subscription.

12. The method of claim 1, further comprising:
determining an uplink transmission for the second subscription in the one or more slots that at least partially overlaps in time with a downlink transmission for the first subscription in the one or more slots; and
prioritizing communications of the first subscription based at least in part on the downlink transmission for the first subscription and the uplink transmission for the second subscription.

13. The method of claim 1, further comprising:
transmitting, to a base station, a capability message indicating that the UE supports communications of the first subscription and communications of the second subscription.

14. The method of claim 1, further comprising:
transmitting, to a base station supporting communications of the second subscription, a message indicating that communications of the first subscription in the one or more slots are prioritized over communications of the second subscription.

15. The method of claim 1, wherein prioritizing comprises:
prioritizing communications of the first subscription in the one or more slots over communications of the second subscription based at least in part on the first subscription corresponding to a primary subscription of the UE and the second subscription corresponding to a second subscription of the UE.

16. The method of claim 1, further comprising:
receiving a prioritization configuration from a base station indicating that the first subscription is of higher priority than the second subscription, wherein the prioritizing is based at least in part on the prioritization configuration.

17. The method of claim 1, further comprising:
refraining from communicating in the second direction using the second channel in one or more slots according to the second subscription based at least in part on the prioritizing.

18. The method of claim 1, wherein the communicating further comprises:
communicating in the first direction in a half-duplex mode.

19. A method for wireless communications at a base station, comprising:
configuring a first channel of a user equipment (UE) for communications of a first subscription of the UE;

receiving, from the UE, a message indicating that communications of a second subscription of the UE in one or more slots are prioritized over communications of the first subscription; and transmitting, to the UE, scheduling information for the first channel based at least in part on the message, the scheduling information indicating communications of the first subscription of the UE in at least one slot non-overlapping with the one or more slots.

20. The method of claim 19, further comprising:
transmitting a prioritization configuration to the UE indicating that the second subscription is of higher priority than the first subscription.

21. The method of claim 19, further comprising:
receiving, from the UE, a capability message indicating that the UE supports communications of the first subscription and communications of the second subscription.

22. The method of claim 19, further comprising:
transmitting a time division duplex uplink-downlink configuration for the first subscription for a set of slots including the one or more slots based at least in part on the message, wherein the time division duplex uplink-downlink configuration modifies a communication direction of the first subscription in the one or more slots.

23. An apparatus for wireless communications at a user equipment (UE), comprising:
a processor,
memory coupled with the processor; and
instructions stored in the memory and executable by the processor to cause the apparatus to:
configure a first channel of the UE for a first subscription and a second channel of the UE for a second subscription;
determine one or more slots for the first subscription for communicating in a first direction and for the second subscription for communicating in a second direction, the first direction comprising one of an uplink direction or a downlink direction and the second direction comprising the other of the uplink direction or downlink direction different than the first direction;
prioritize communications of the first subscription in the one or more slots over communications of the second subscription based at least in part on the determining; and
communicate in the first direction using the first channel in the one or more slots according to the first subscription based at least in part on the prioritizing.

24. The apparatus of claim 23, wherein the instructions are further executable by the processor to cause the apparatus to:
receive a time division duplex uplink-downlink configuration for the first subscription for a set of slots including the one or more slots, wherein determining the one or more slots is based at least in part on the time division duplex uplink-downlink configuration.

25. The apparatus of claim 24, wherein the instructions are further executable by the processor to cause the apparatus to:
receive a second time division duplex uplink-downlink configuration for the second subscription for a second set of slots including the one or more slots; and determine a difference between the first direction and the second direction for the one or more slots based in part on the time division duplex uplink-downlink configuration and the second time division duplex uplink-downlink configuration, wherein the prioritizing is based at least in part on the difference.

26. The apparatus of claim 24, wherein the instructions are further executable by the processor to cause the apparatus to:
receive scheduling information indicating a transmission for the second subscription in the second direction via at least one slot of the one or more slots; and
determine a difference between the first direction and the second direction for the at least one slot based in part on the time division duplex uplink-downlink configuration and the transmission for the second subscription in the second direction, wherein the prioritizing is based at least in part on the difference.

27. The apparatus of claim 23, wherein the instructions are further executable by the processor to cause the apparatus to:
receive a time division duplex uplink-downlink configuration for the second subscription for a set of slots including the one or more slots, wherein determining the one or more slots is based at least in part on the time division duplex uplink-downlink configuration.

28. The apparatus of claim 27, wherein the instructions are further executable by the processor to cause the apparatus to:
receive scheduling information indicating a transmission for the first subscription in the first direction via at least one slot of the one or more slots; and
determine a difference between the first direction and the second direction for the at least one slot based in part on the time division duplex uplink-downlink configuration and the transmission for the first subscription in the first direction, wherein the prioritizing is based at least in part on the difference.

29. An apparatus for wireless communications at a base station, comprising:
a processor,
memory coupled with the processor; and
instructions stored in the memory and executable by the processor to cause the apparatus to:
configure a first channel of a user equipment (UE) for communications of a first subscription of the UE;
receive, from the UE, a message indicating that communications of a second subscription of the UE in one or more slots are prioritized over communications of the first subscription; and
transmit, to the UE, scheduling information for the first channel based at least in part on the message, the scheduling information indicating communications of the first subscription of the UE in at least one slot non-overlapping with the one or more slots.

30. The apparatus of claim 29, wherein the instructions are further executable by the processor to cause the apparatus to:
transmit a prioritization configuration to the UE indicating that the second subscription is of higher priority than the first subscription.

* * * * *